United States Patent [19]

Soderberg et al.

[11] 4,422,148
[45] * Dec. 20, 1983

[54] ELECTRONIC POSTAGE METER HAVING PLURAL COMPUTING SYSTEMS

[75] Inventors: John H. Soderberg, Monroe, N.Y.; Alton B. Eckert, Norwalk; Robert B. McFiggans, Stamford, both of Conn.

[73] Assignee: Pitney Bowes Inc.

[ * ] Notice: The portion of the term of this patent subsequent to Nov. 17, 1998 has been disclaimed.

[21] Appl. No.: 261,001

[22] Filed: May 6, 1981

Related U.S. Application Data

[62] Division of Ser. No. 89,413, Oct. 30, 1979, Pat. No. 4,301,507.

[51] Int. Cl.³ .............................................. G06F 15/20
[52] U.S. Cl. ................................... 364/464; 364/900; 364/704; 364/409
[58] Field of Search .............. 364/200, 409, 464, 466, 364/704, 900

[56] References Cited

U.S. PATENT DOCUMENTS

| | | | |
|---|---|---|---|
| 2,934,009 | 4/1960 | Bach et al. | 101/235 |
| 3,407,387 | 10/1968 | Looschen et al. | 364/900 |
| 3,893,078 | 7/1975 | Finet | 371/38 X |
| 3,910,322 | 10/1975 | Hardesty, Jr. et al. | 371/34 X |
| 3,938,095 | 2/1976 | Check, Jr. et al. | 364/900 |
| 3,942,436 | 3/1976 | Lupkas | 101/93.43 |
| 3,978,457 | 8/1976 | Check, Jr. et al. | 364/200 |
| 4,021,780 | 5/1977 | Narey et al. | 364/900 |
| 4,050,374 | 9/1977 | Check, Jr. | 101/91 |
| 4,084,228 | 4/1978 | Dufond et al. | 364/200 |
| 4,093,999 | 6/1978 | Fuller et al. | 364/900 |
| 4,097,923 | 6/1978 | Eckert, Jr. et al. | 364/900 |
| 4,100,601 | 7/1978 | Kaufman et al. | 364/200 |
| 4,137,564 | 1/1979 | Spencer | 364/200 |
| 4,180,856 | 12/1979 | Check, Jr. et al. | 364/466 |
| 4,220,991 | 9/1980 | Hamano et al. | 364/405 |

FOREIGN PATENT DOCUMENTS

| | | |
|---|---|---|
| 869396 | 5/1961 | United Kingdom . |
| 1051132 | 12/1966 | United Kingdom . |
| 1091706 | 11/1967 | United Kingdom . |
| 1402986 | 8/1975 | United Kingdom . |
| 1428704 | 3/1976 | United Kingdom . |
| 1482860 | 8/1977 | United Kingdom . |
| 1512857 | 6/1978 | United Kingdom . |
| 1518222 | 7/1978 | United Kingdom . |

*Primary Examiner*—Jerry Smith
*Assistant Examiner*—William G. Niessen
*Attorney, Agent, or Firm*—David E. Pitchenik; William D. Soltow, Jr.; Albert W. Scribner

[57] ABSTRACT

An electronic postal meter has a control unit, an accounting unit and a printing unit, each incorporating a CPU having a separate crystal controlled clock. Communication between the units is serial character asynchronous, bit synchronous, in message form, with the bits of the messages being timed in accordance with a given schedule for synchronous control. The messages themselves, upon receipt by a receiver, are returned bit by bit to the transmitter, for checking, whereupon the transmitter sends a no-error pulse upon successful comparison of the transmitted message and the message received from the receiver. All control and data signals utilize the same pair of conductors in each direction with precisely defined timing for control.

19 Claims, 43 Drawing Figures

SUMMARY FLOW CHARTS OF THE CONTROL UNIT

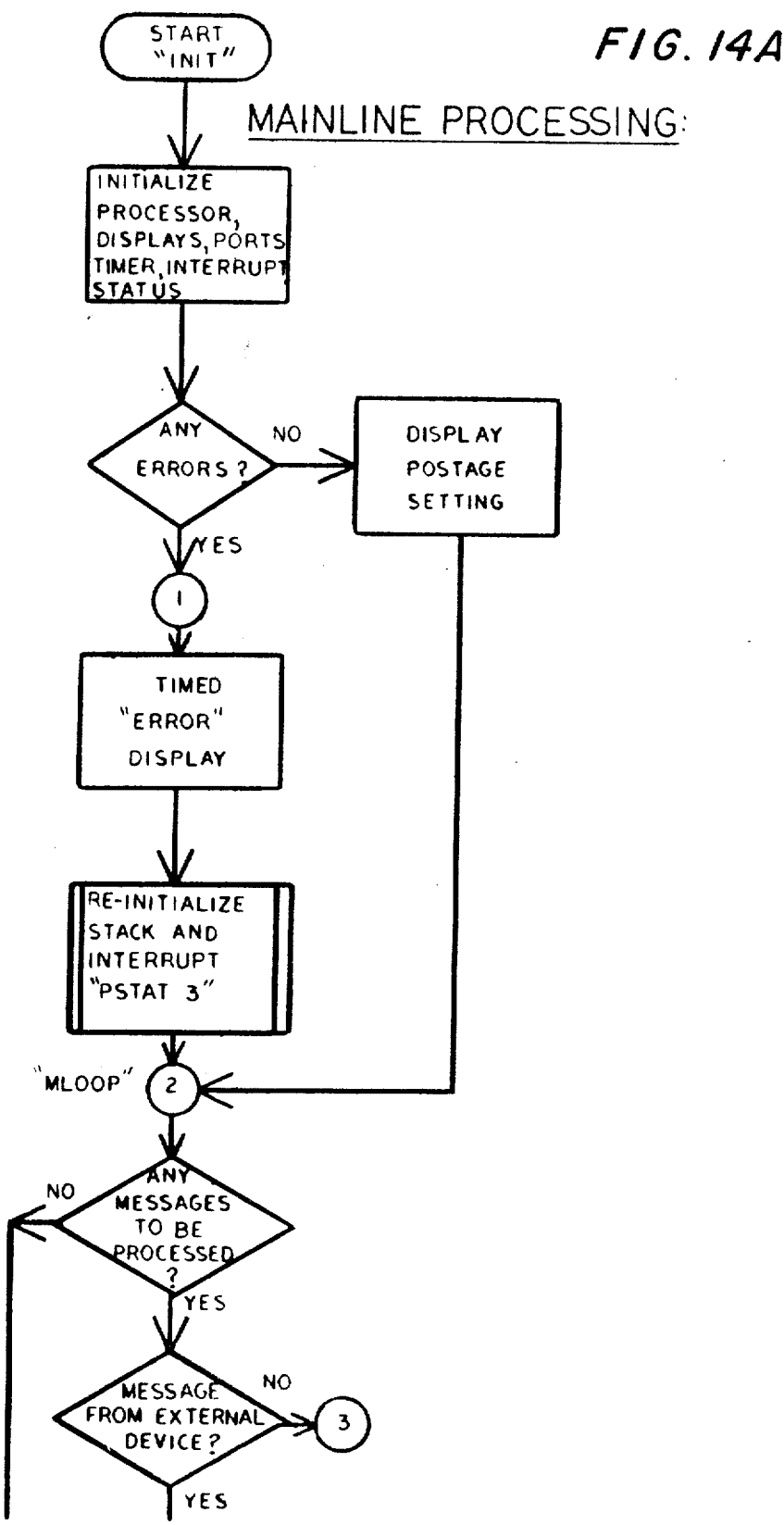

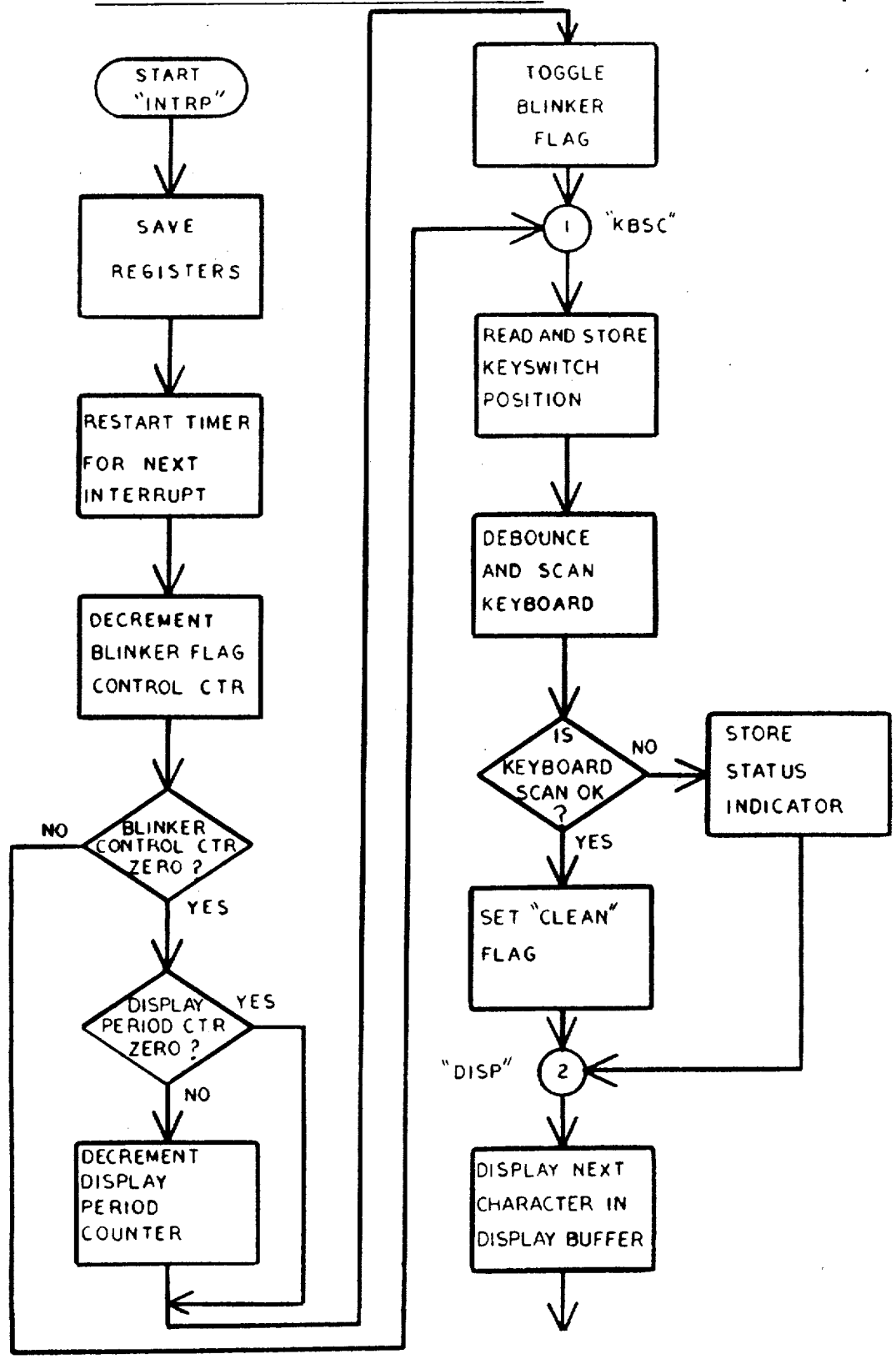

SUMMARY FLOW CHARTS
FOR PRINTER UNIT

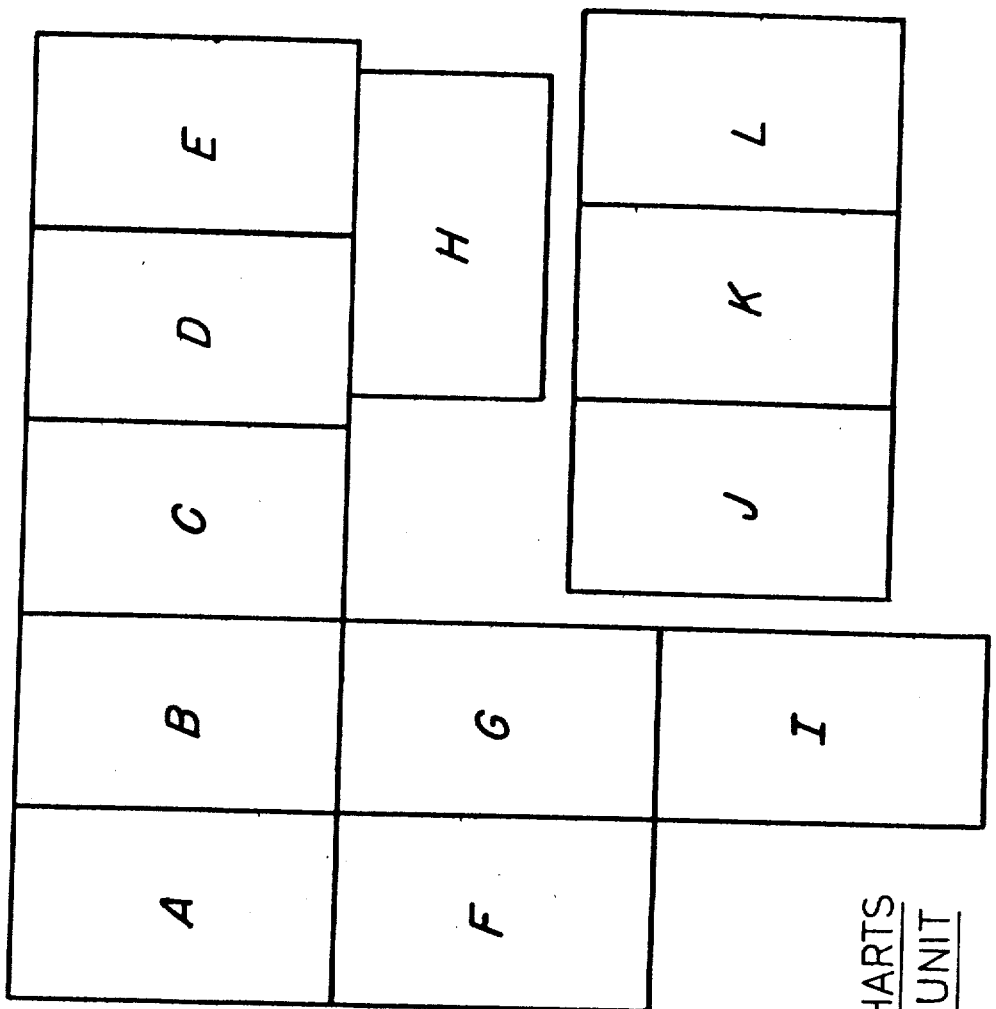
FIG. 16 SUMMARY FLOW CHARTS FOR ACCOUNTING UNIT

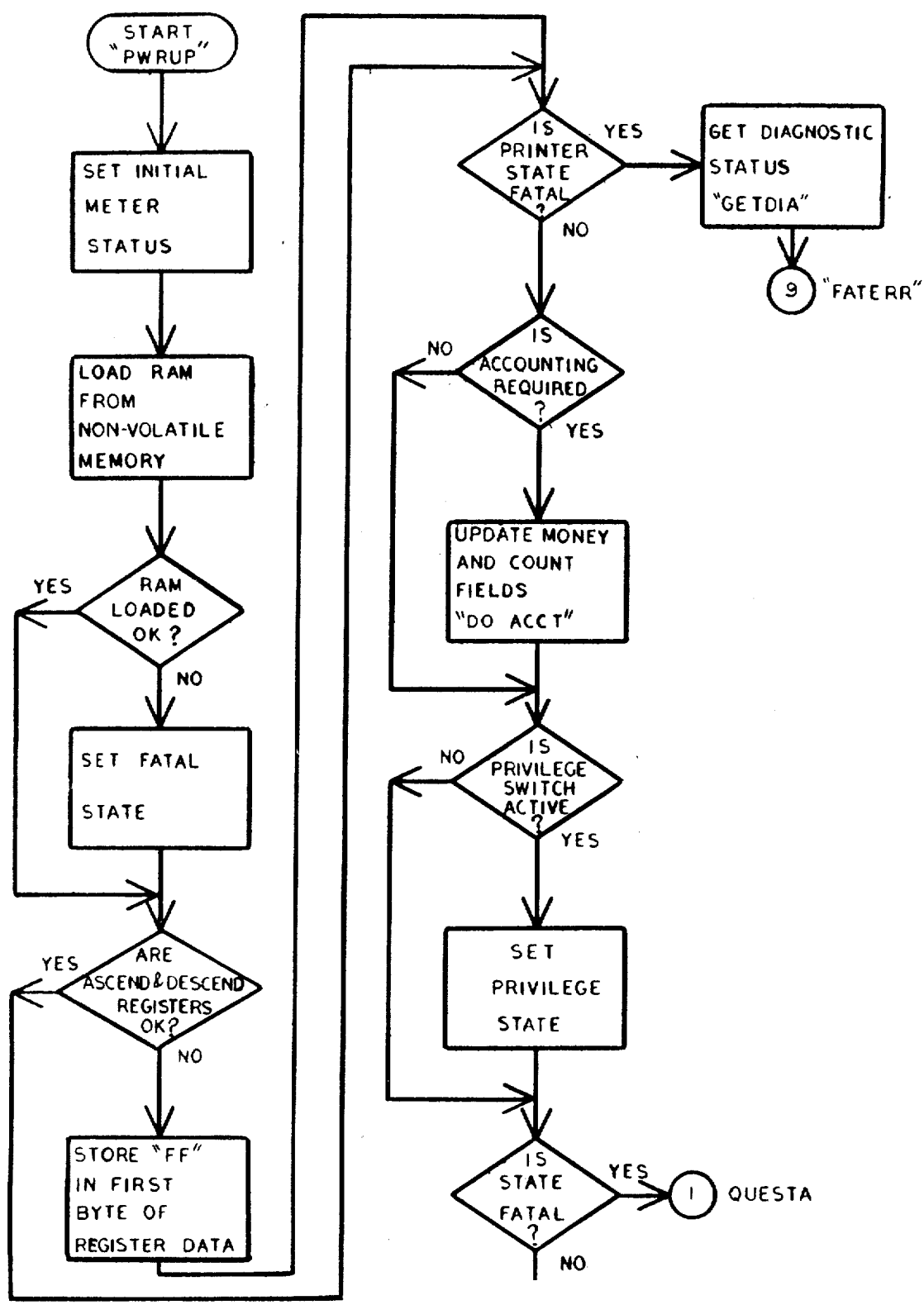

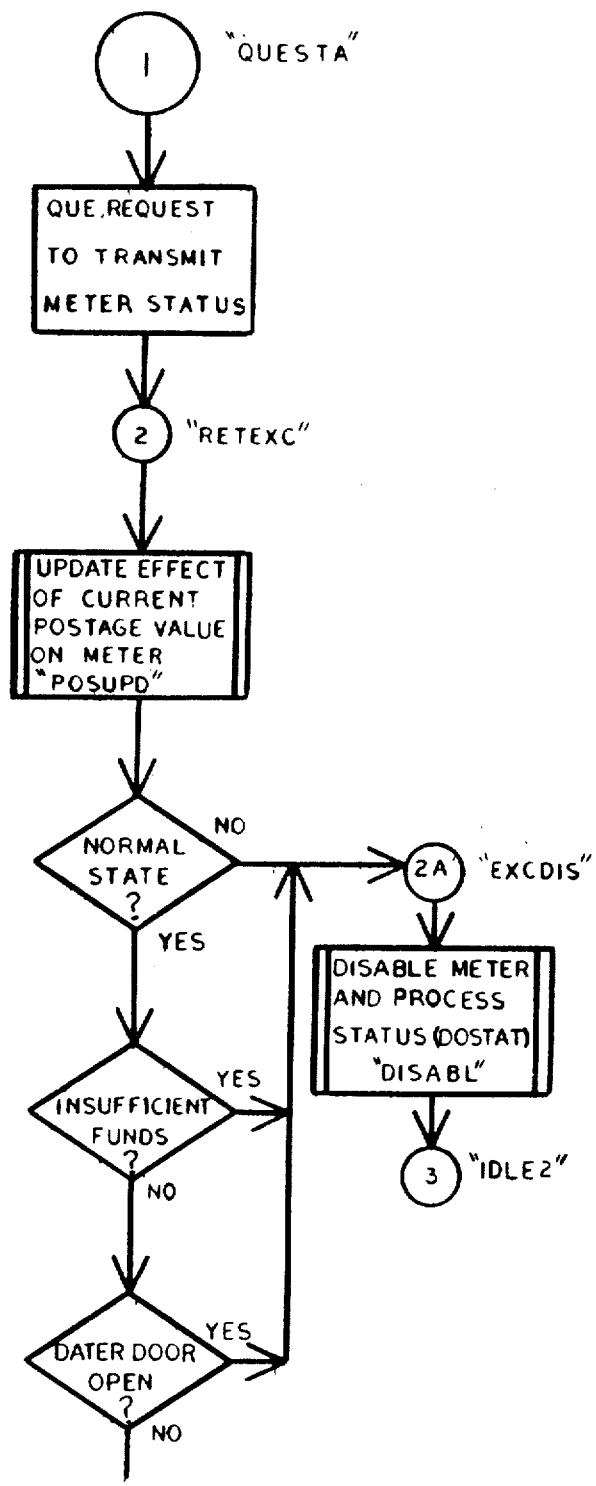
MAINLINE PROCESSING: FIG.16B

POWER DOWN PROCESSING:

ELECTRONIC POSTAGE METER HAVING PLURAL COMPUTING SYSTEMS

This is a division of application Ser. No. 89,413, filed Oct. 30, 1979, now U.S. Pat. No. 4,301,507.

This invention relates to electronic postage meters, and is more particularly directed to an electronic postage meter of the type having a keyboard for the entry of postage to be printed, a display for displaying postage to be printed as well as other data, an electronic accounting device, and a printing mechanism.

Devices of the above type are generally known, and are discussed, for example, in U.S. Pat. No. 3,978,457. This patent discloses a system for a postal meter including a keyboard for the manual introduction of data corresponding to the postage to be printed In prior devices of the general category including electronic postal meter operation, it has been found desirable to employ one or more microprocessors to control various meter functions and operations. For security reasons, all data relating to accounting may be maintained separately from other data relating to nonsecure information. By separate maintenance of secure data it is therefore possible to improve security while employing concepts of distributed processing by the use of multiple processors.

The use of multiple processing in a secure environment places stringent requirements on error rate in interprocessor communications, which requirements must be satisfied in order to have successful operation. It is further desirable to provide a system of this type which can easily subrogate its control authority to an external unit, thereby allowing substantially one hundred percent control of meter function to be transferred to an external device, without any change in system hardware. In addition, the use of electronics in postal meters allows the capability of greater sophistication in automatic recharging the accounting registers without the need for operating personnel. It is a desirable feature of any meter therefore to provide improved methods of detecting tampering and performing self diagnostic error checking.

It is therefore a principal object of the present invention to provide a distributed processing system for generating and imprinting postal values which will maintain secure data in segregation from non secure data.

It is a further object of the present invention to provide an interprocessor communication system which will minimize error as a result of multiple processor inter-communication.

It is a still further object of the present invention to provide improved self-diagnostic error checking.

The foregoing objects are achieved in accordance with the present invention by the provision of a postal meter having two or more units that are each provided with computer control, and to additionally provide communication between units. Communication between the units is preferably minimized, for security purposes, and no additional control lines between the units is provided; all control signals appear in the same data serial channel with message data. As a further requirement, it is necessary that the messages be completely error free upon receipt by a receiving unit, in order to insure the integrity of the postage system, in the error free accounting of all postage.

In a preferred embodiment of the invention the postal meter is provided with three units, which although mechanically connected together, are each provided with a CPU, and are each provided with a crystal controlled clock. In accordance with the invention, the frequencies of the clocks of the different units need not be identical, and the communication between the units is by way of serial messages that are asynchronously transmitted and received. The format of the messages, and the timing of the bits in different units is precisely set, however, to insure that messages may be sent and received without the necessity for synchronizing the different units. In addition, upon receipt of the first bits of a message from a transmitting unit, the received bits are retransmitted by the receiver back to the transmitter for comparison, to enable the transmitter to send "no error" within a minimum period of time following the complete message transmission, verifying the correctness of the message as sent and received.

All control and data signals utilize the same pair of conductors in each direction with precisely defined timing for control.

For providing external control, the control flow is in one direction and information flow in the other direction.

All control of the meter and all information inside the meter can be controlled by connection through an interface connector. All functions performed by the meter are controllable electrically from a remote location, except purely local manual functions such as power on and date change. This results from the communication capability of the data units. The organization of the three units results from a flow of commands or control of data from the control unit to the accounting unit and then to the printer unit, for example, relating to a new value of postage and where it is to be set. The flow of information is in the opposite direction such as, for example, a current register value or the like. Within this concept, connection of an external device, such as an electronic scale to the control unit, can operate to place commands or data control instructions information into the meter.

The interface operation allows the external device to take control of the meter, disabling the keyboard. The external device can communicate messages with the display, thereby eliminating the need for a keyboard and display in the external device. One specific advantage of the foregoing arrangement is that the control unit may be physically replaced by the attached external operating device, without any changes in the accounting unit or the printing unit, either in hardware or software.

In order that the invention will be more clearly understood, it will now be disclosed in greater detail with reference to the accompanying drawings, wherein.

Figure 14:
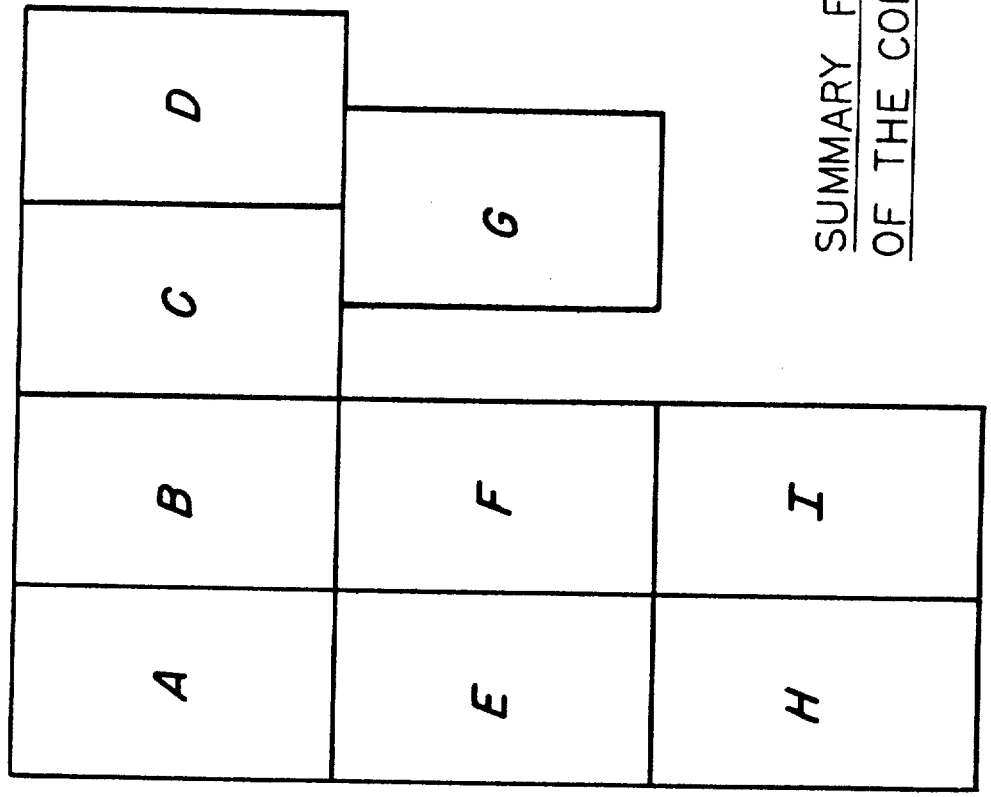
Figure 14B:
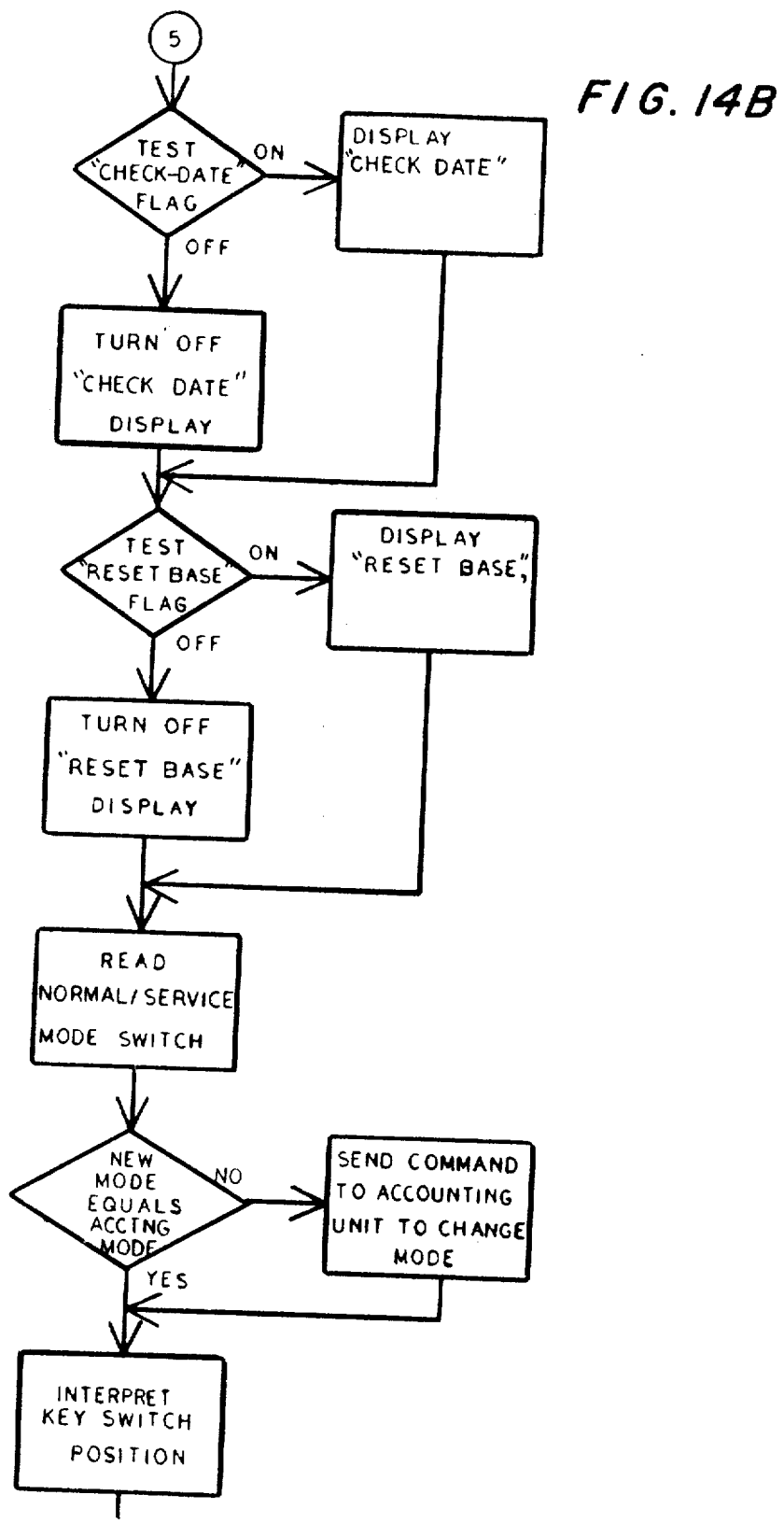
Figure 14D:
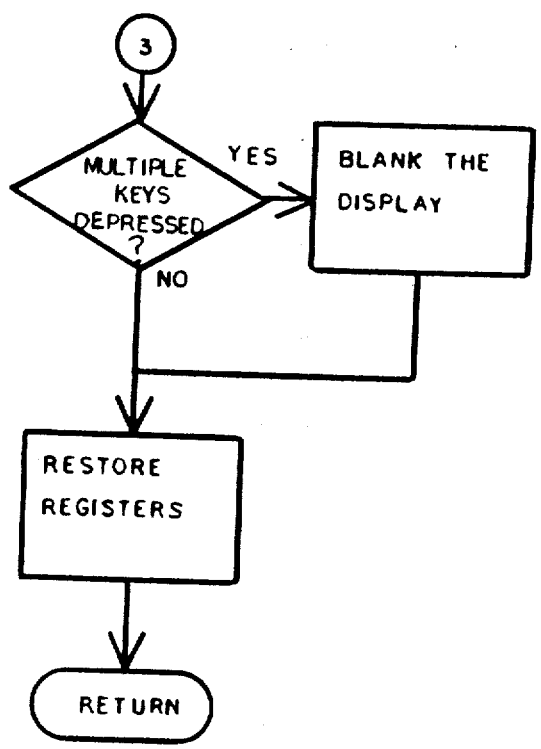
Figure 14E:
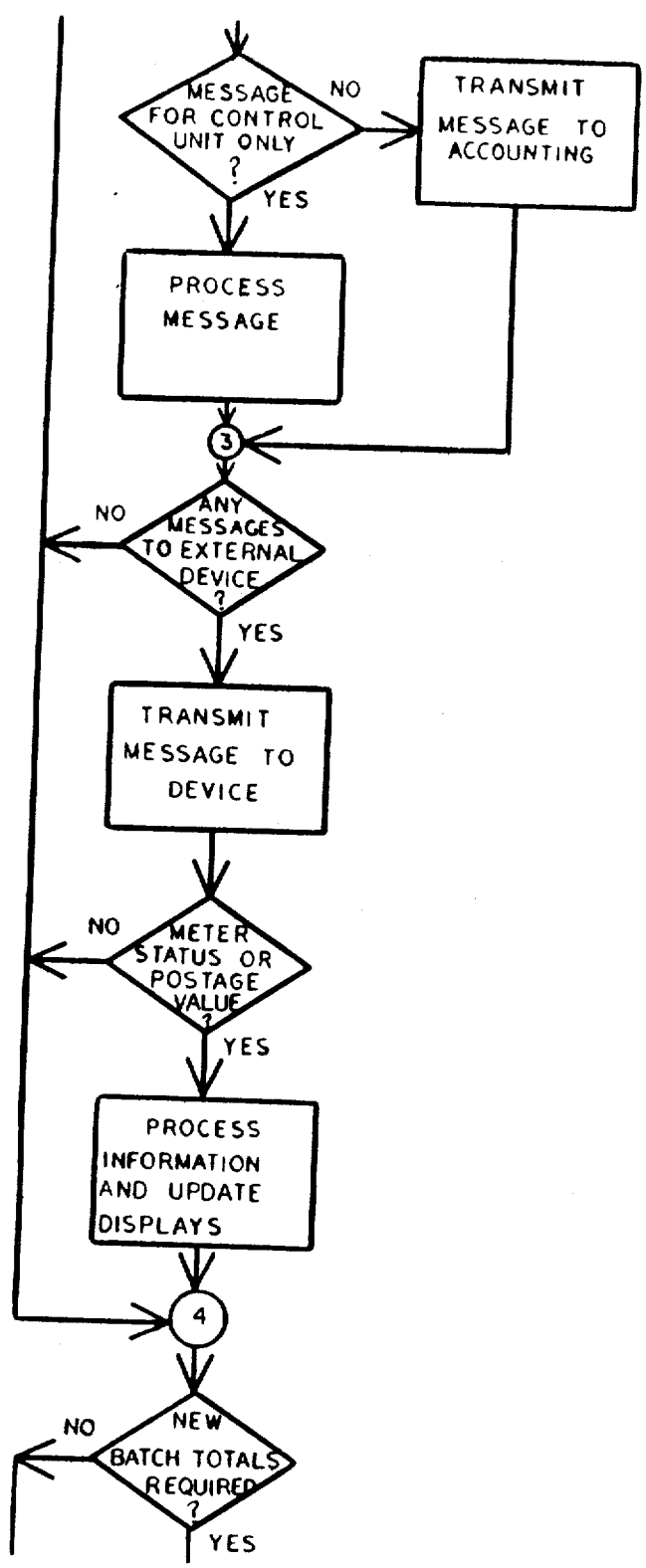
Figure 14F:
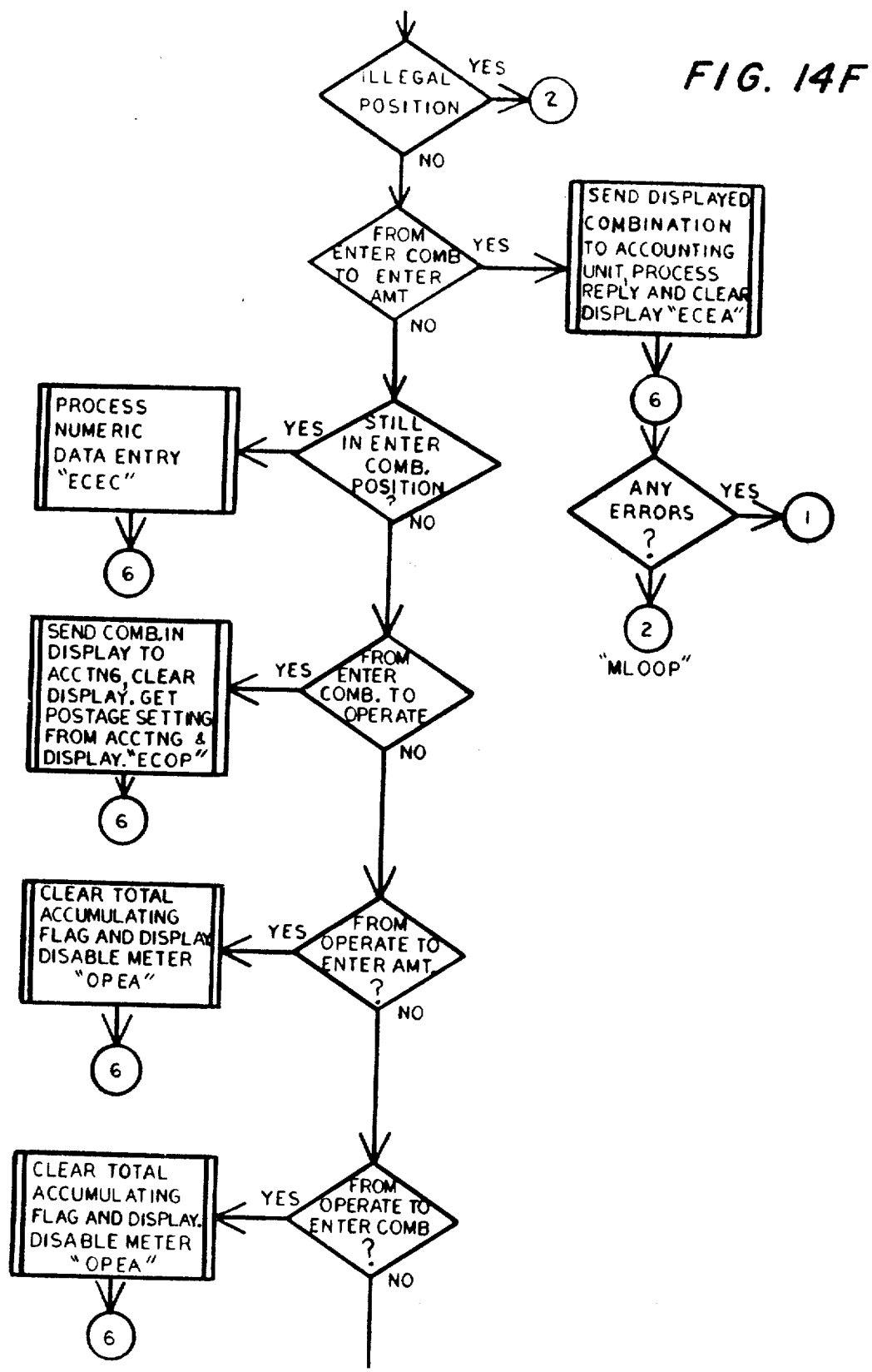
Figure 14G:
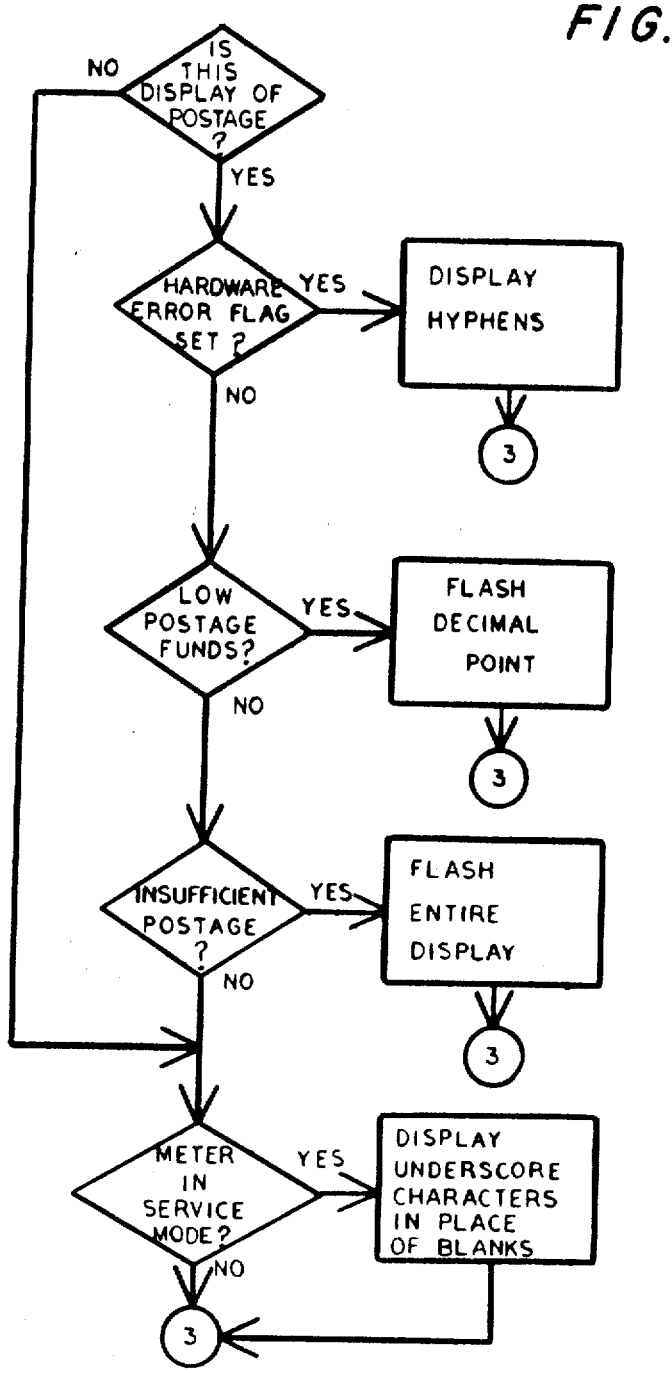
Figure 14H:
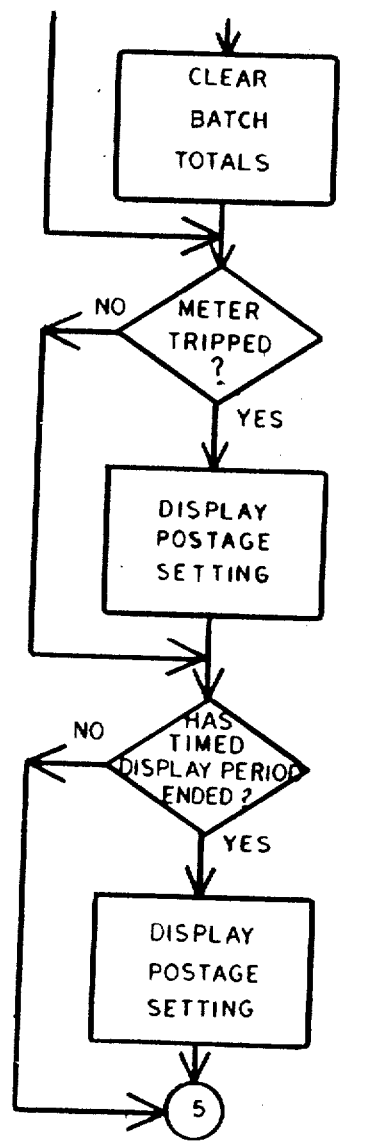
Figure 14I:
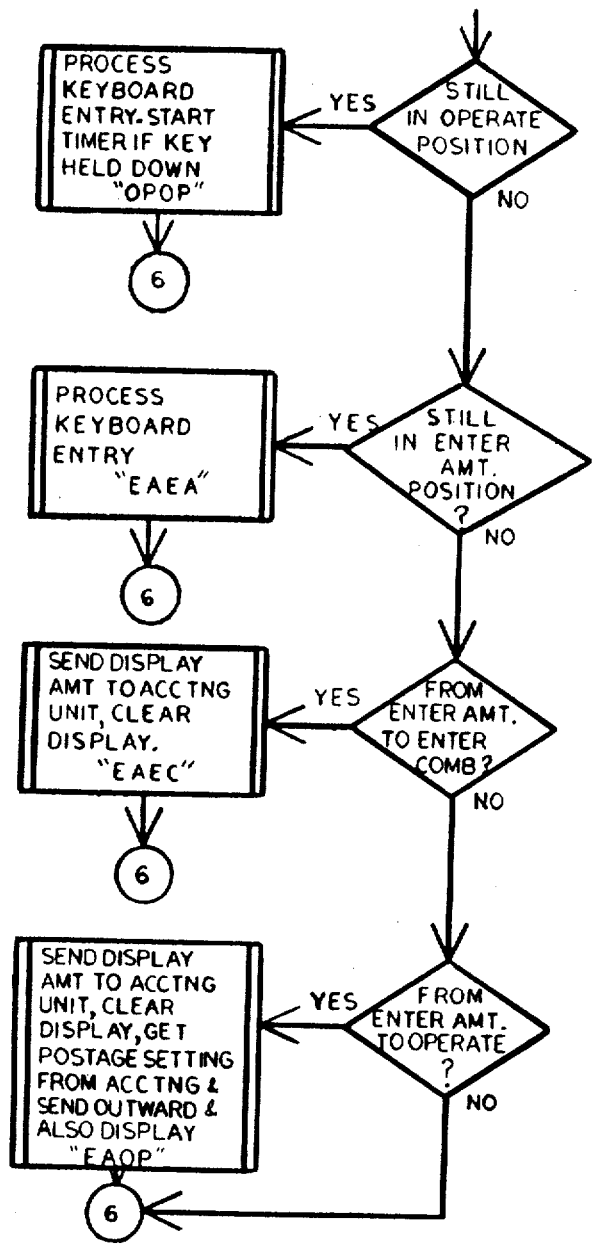

FIG. 14 which comprises FIGS. 14A–14I is a sequential set of flowcharts illustrating the control unit operation.

Figure 15:
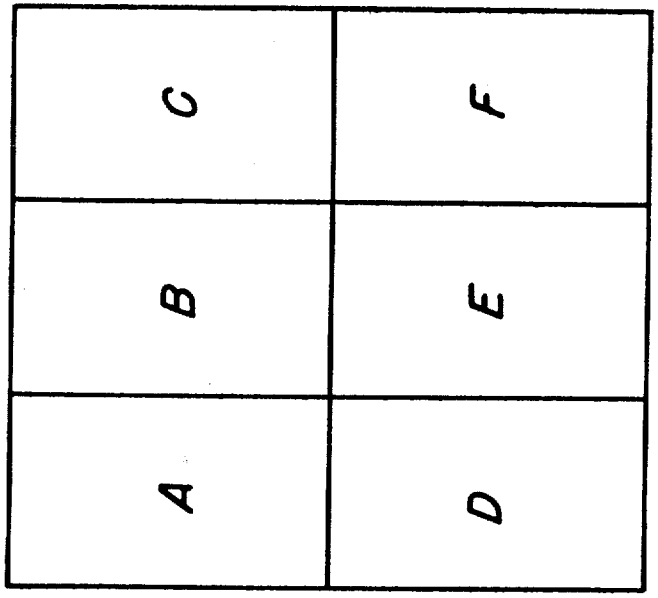
Figure 15A:
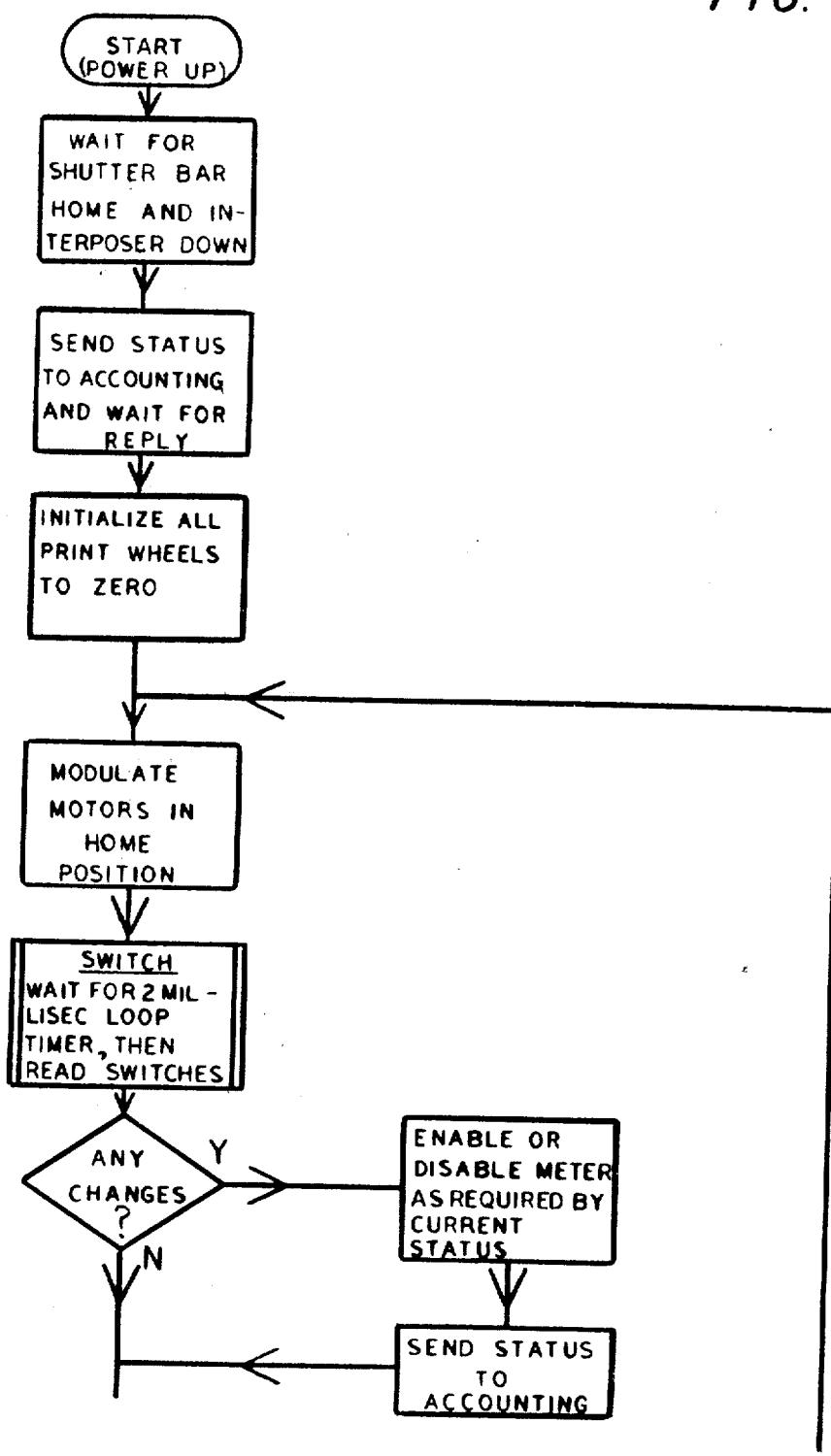
Figure 15B:
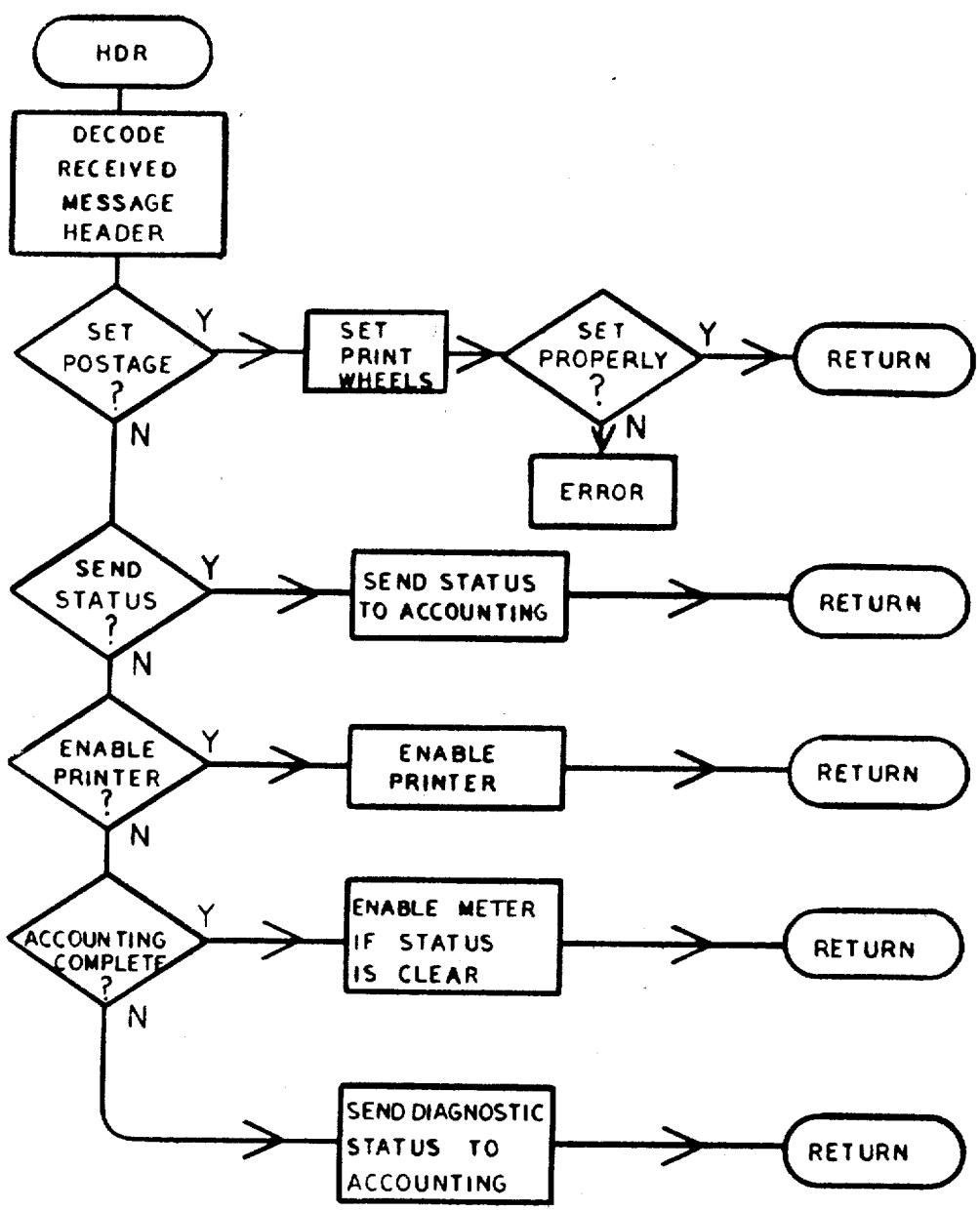
Figure 15C:
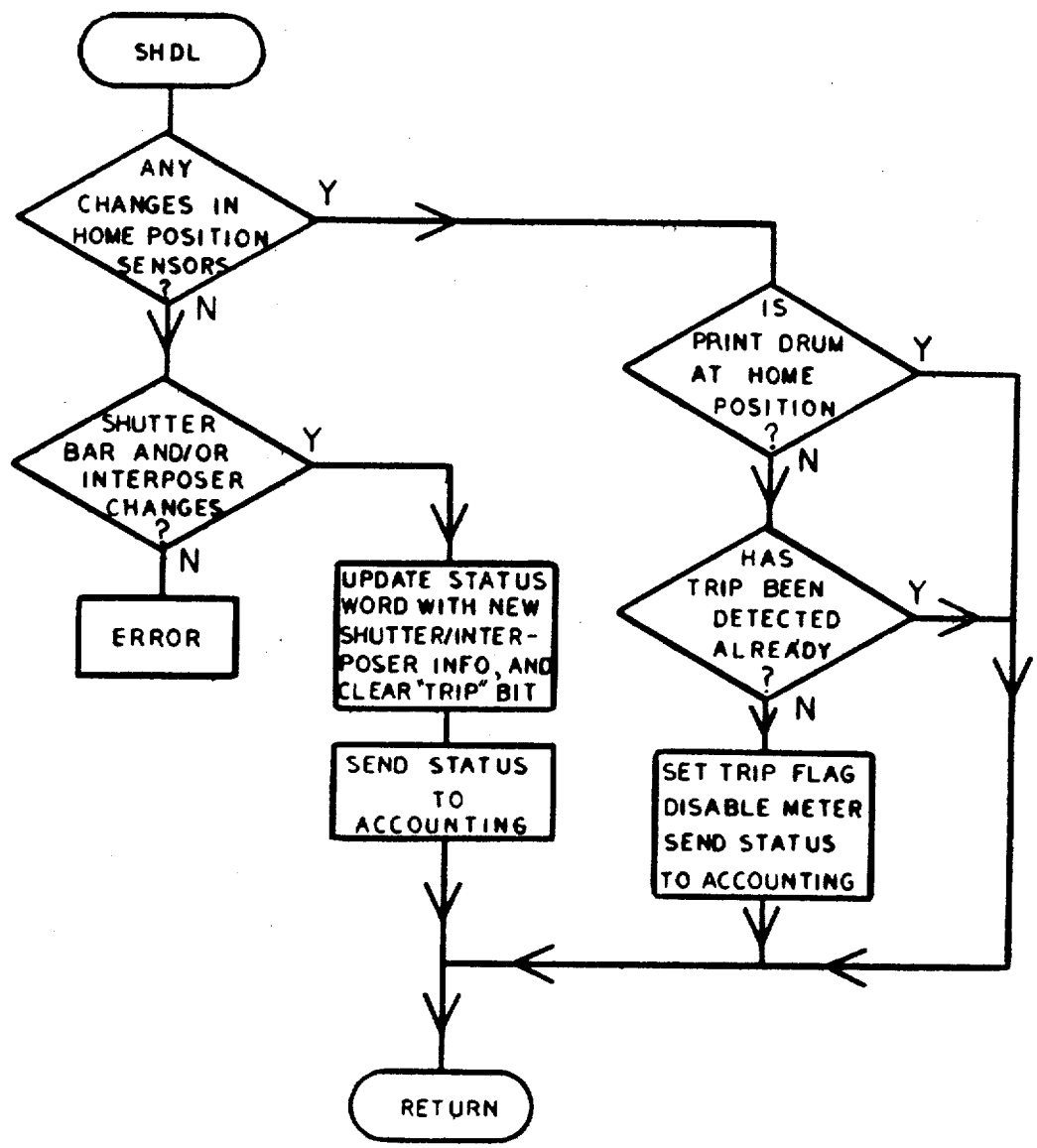
Figure 15D:
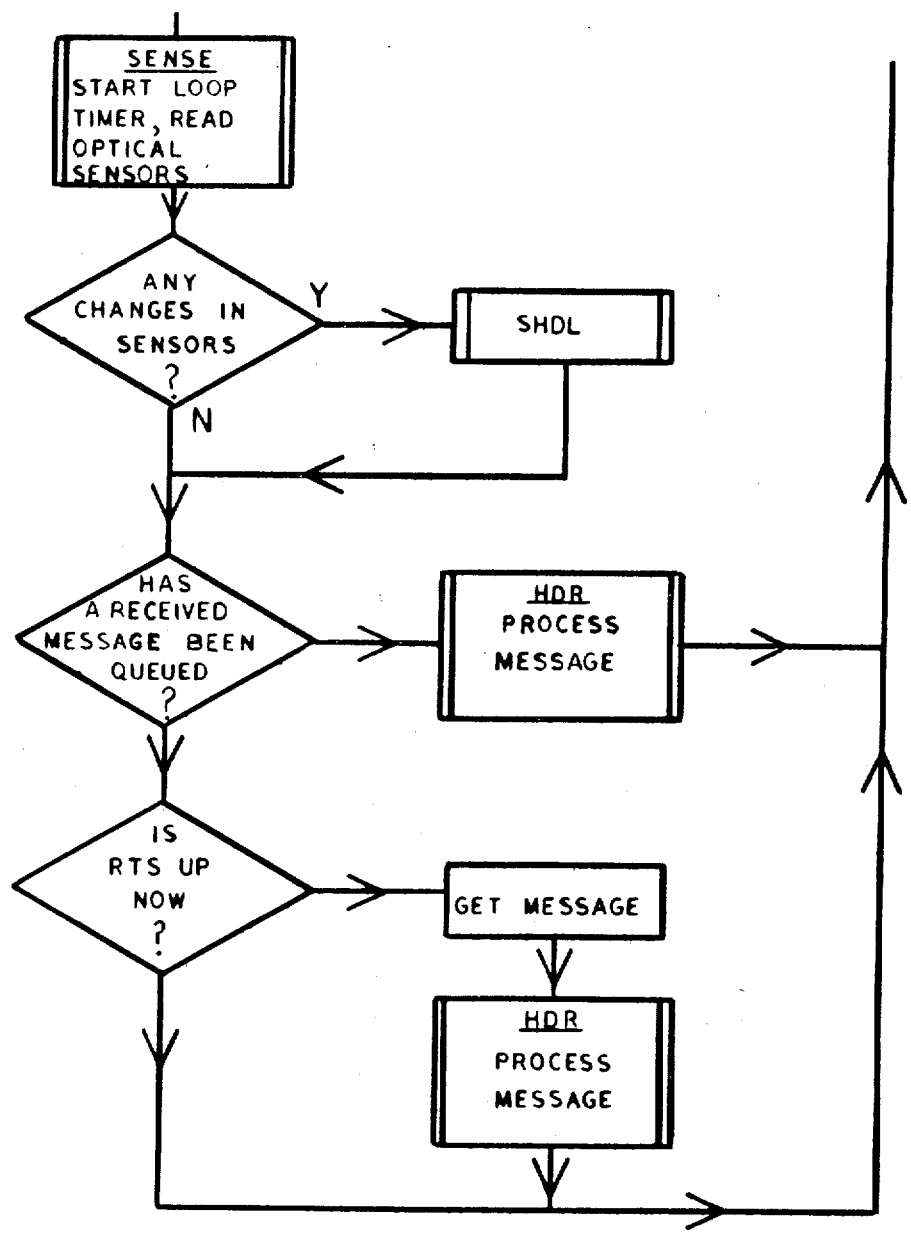
Figure 15E:
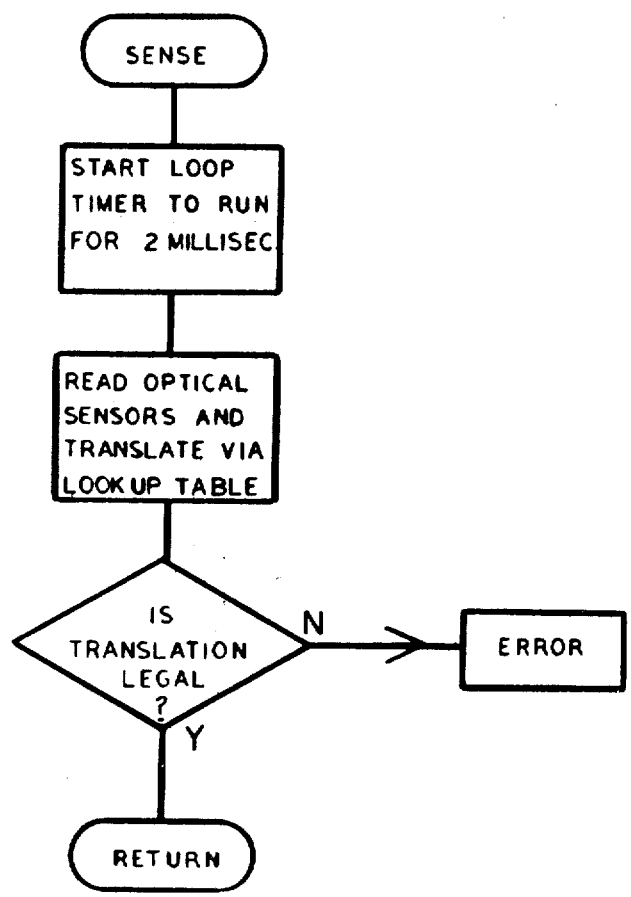
Figure 15F:
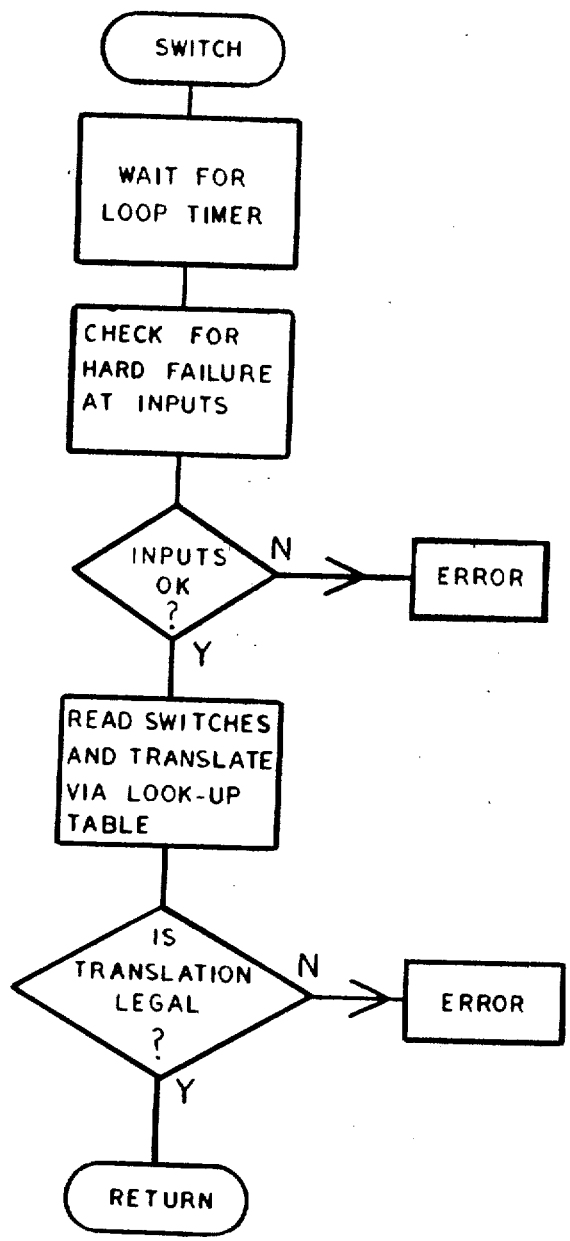
Figure 16C:
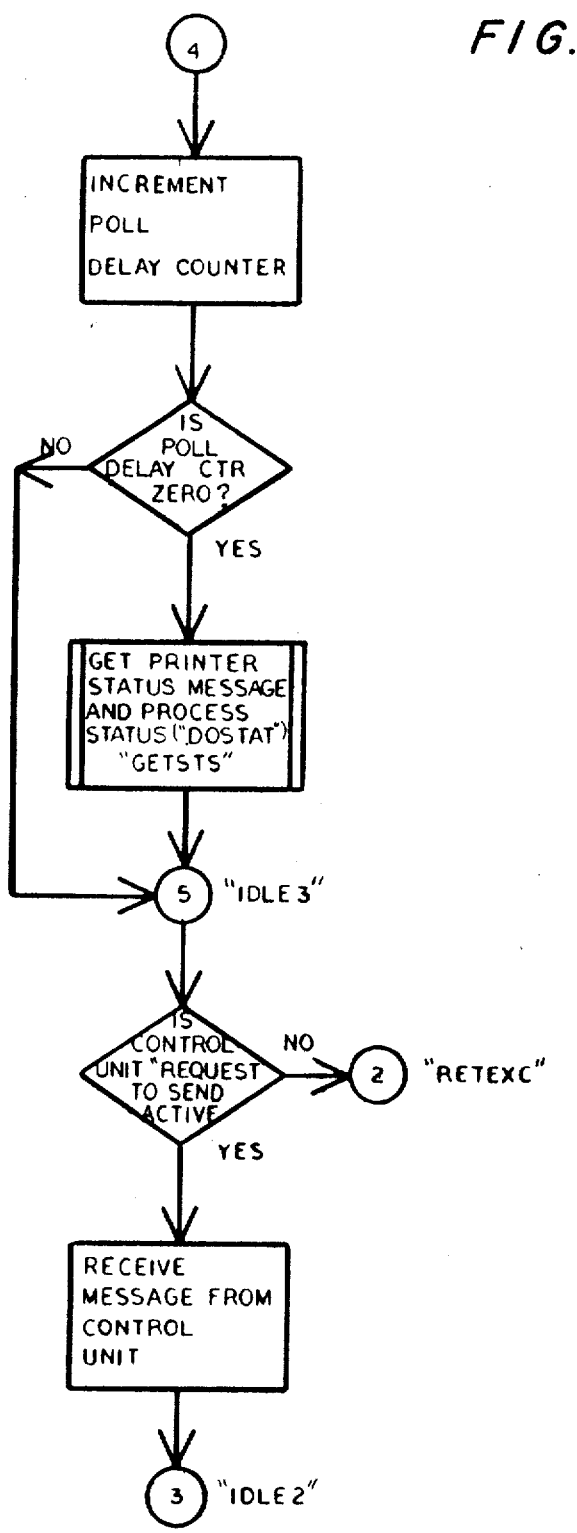
Figure 16D:
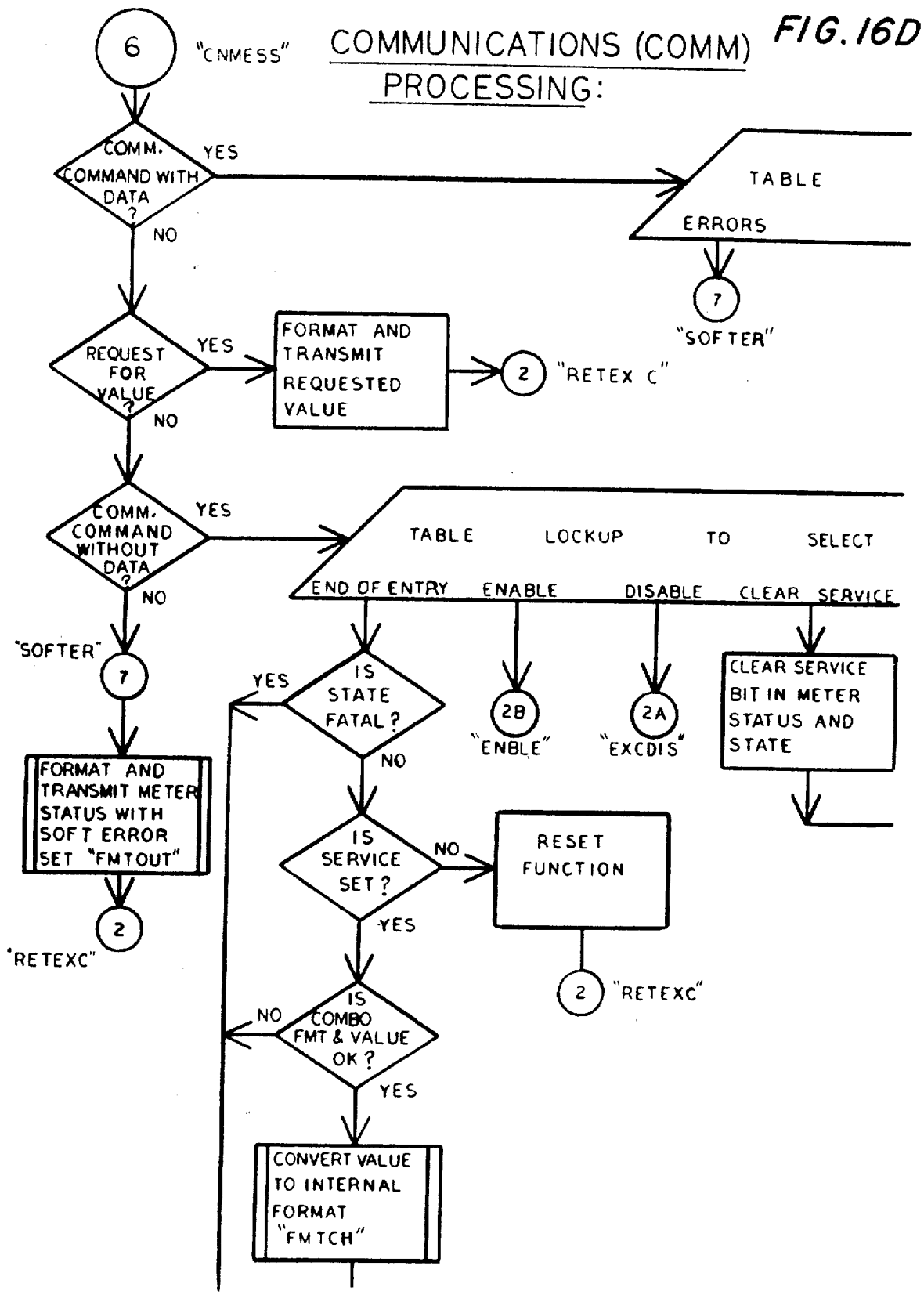
Figure 16E:
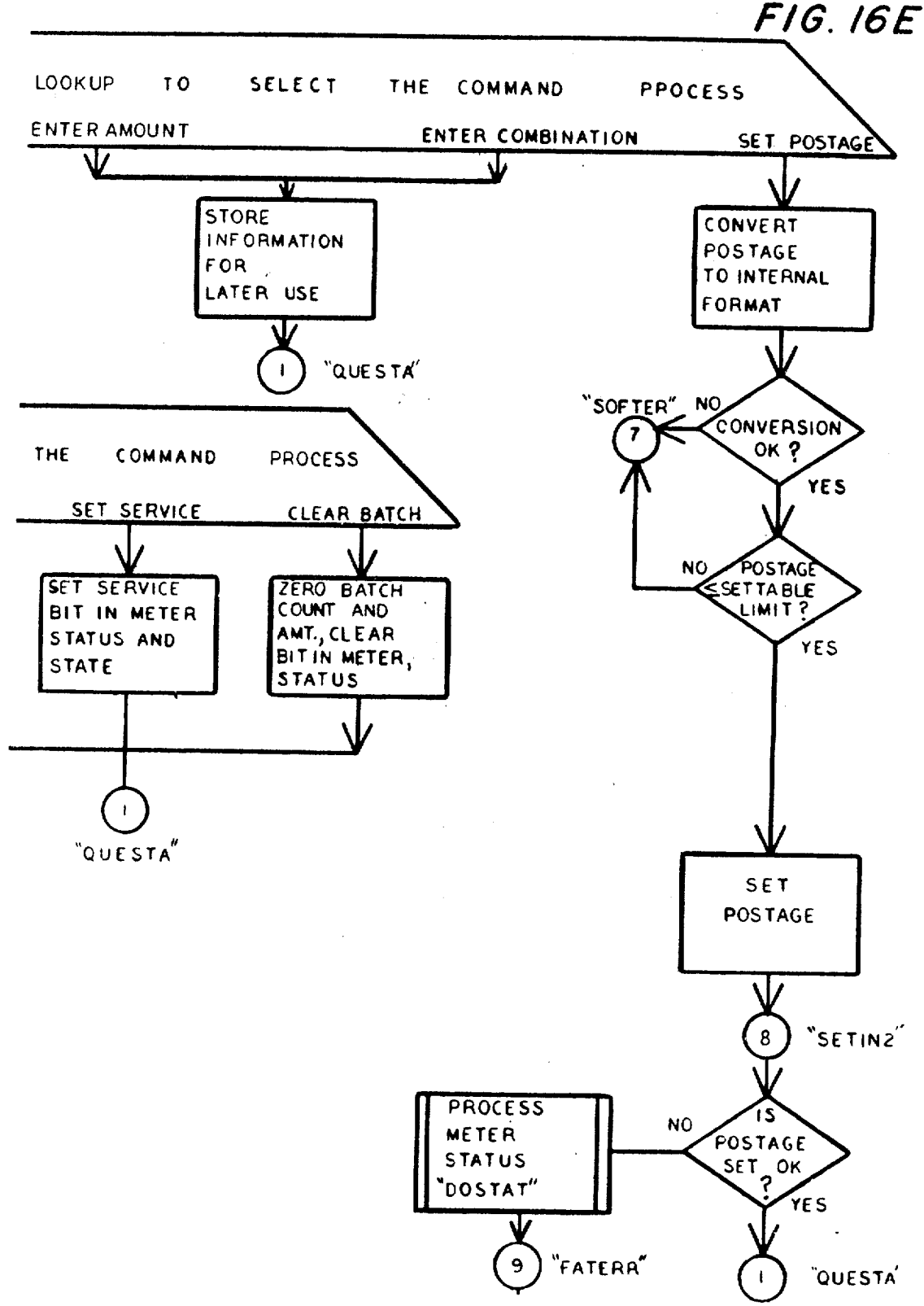
Figure 16F:
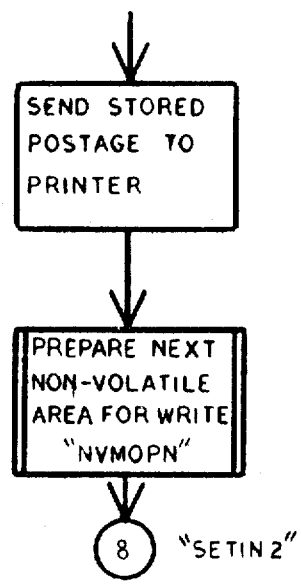
Figure 16F:
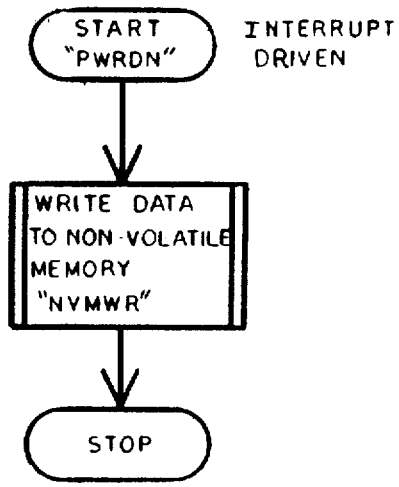
Figure 16G:
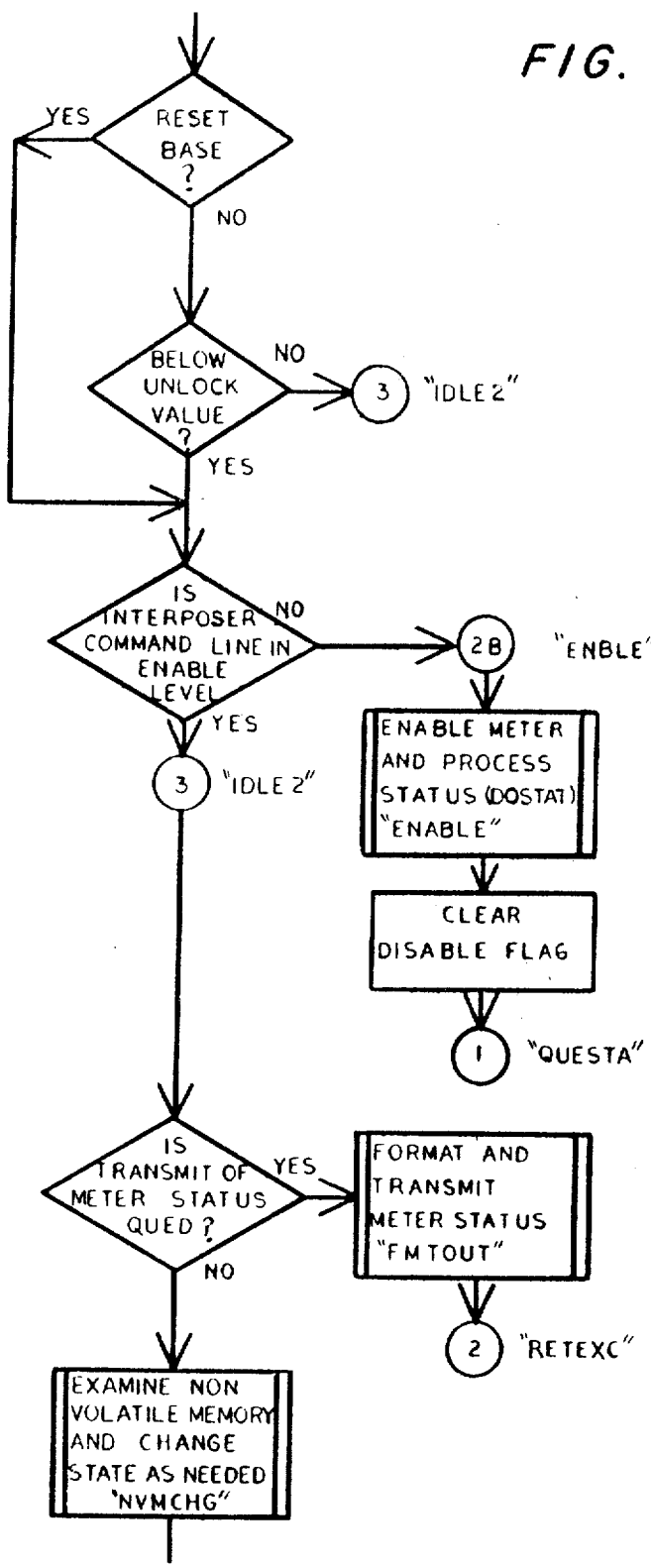
Figure 16H:
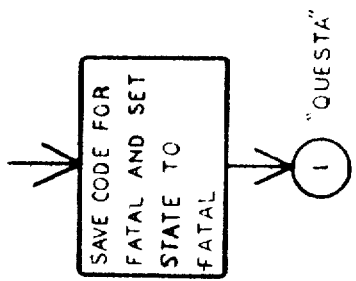
Figure 16H:
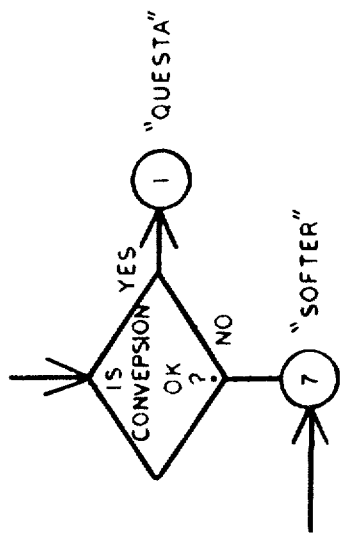
Figure 16I:
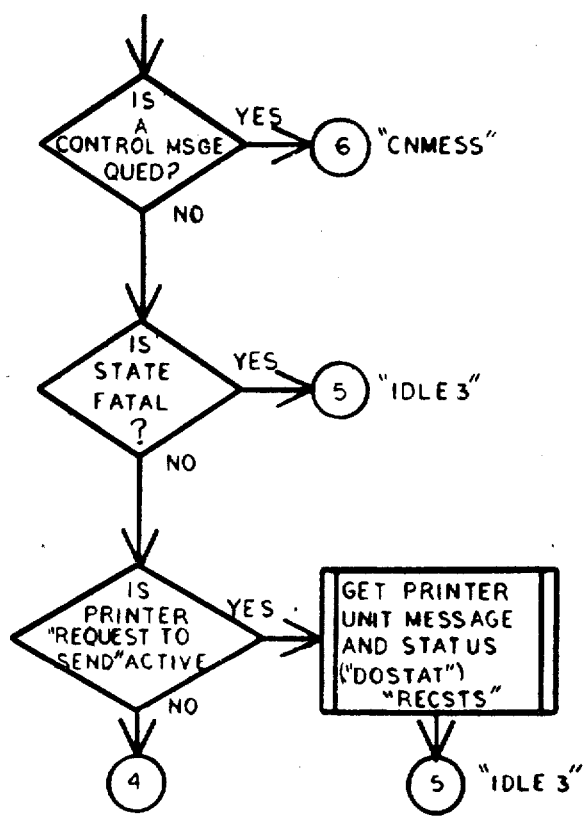
Figure 16J:
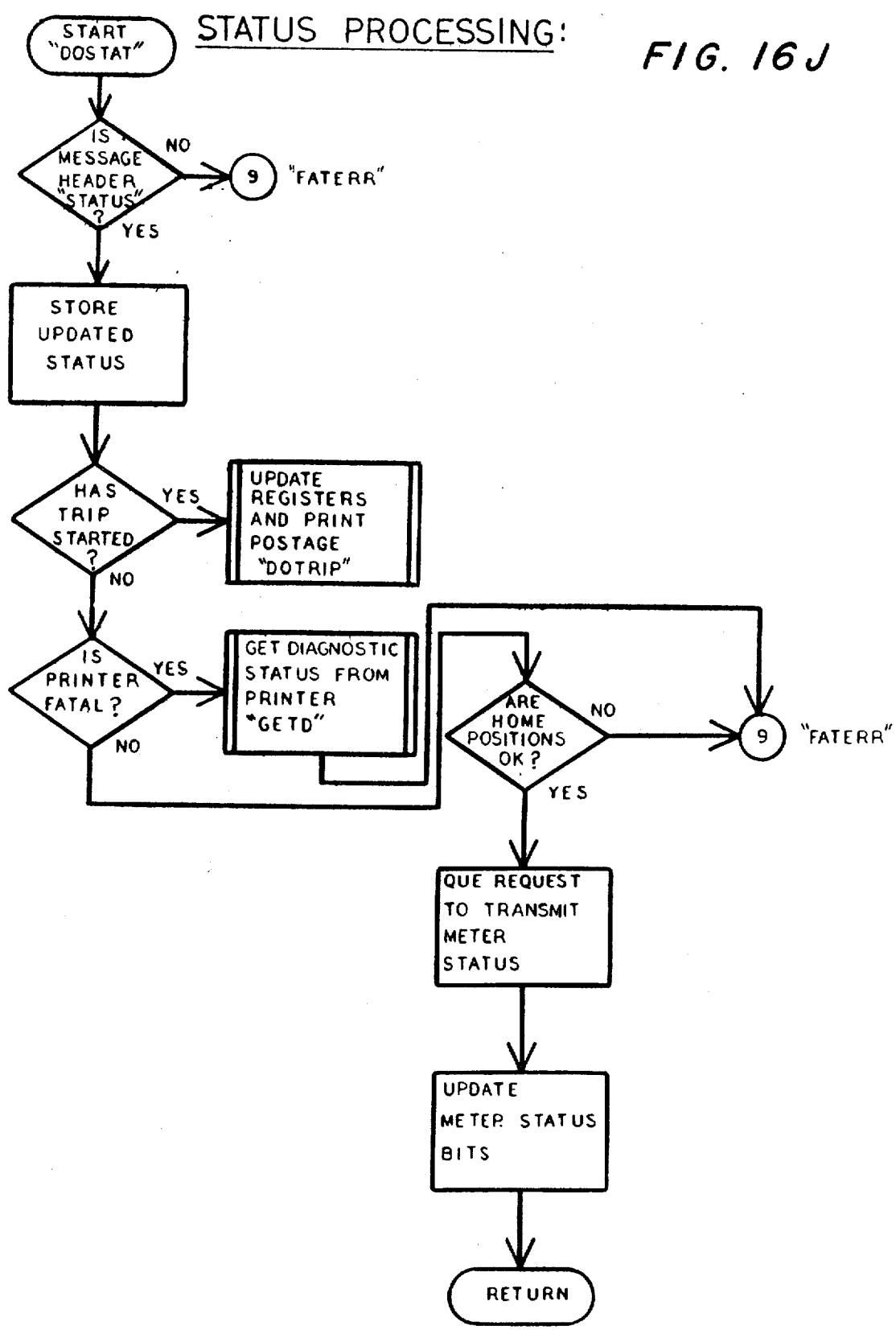
Figure 16K:
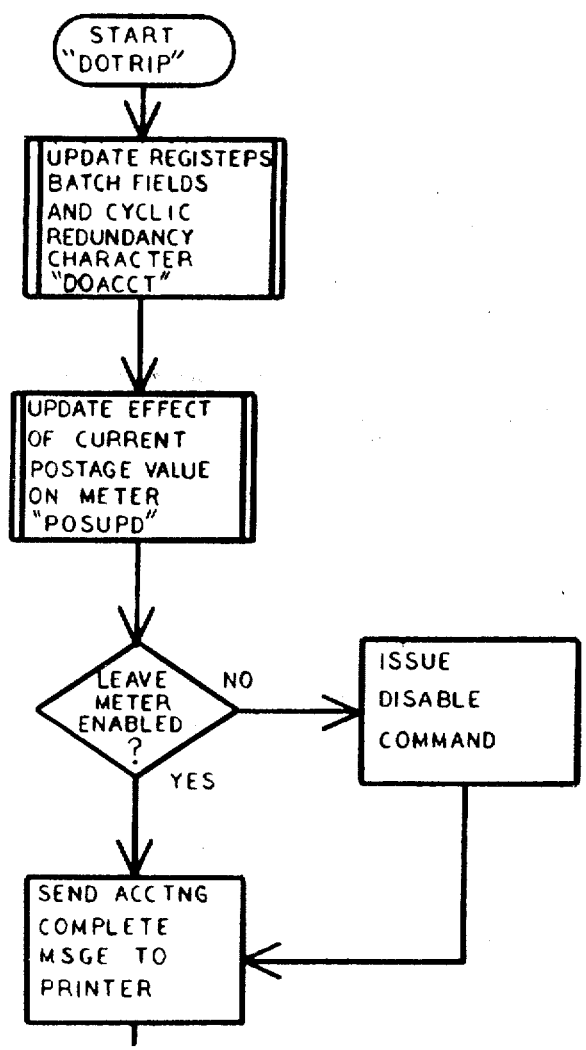
Figure 16L:
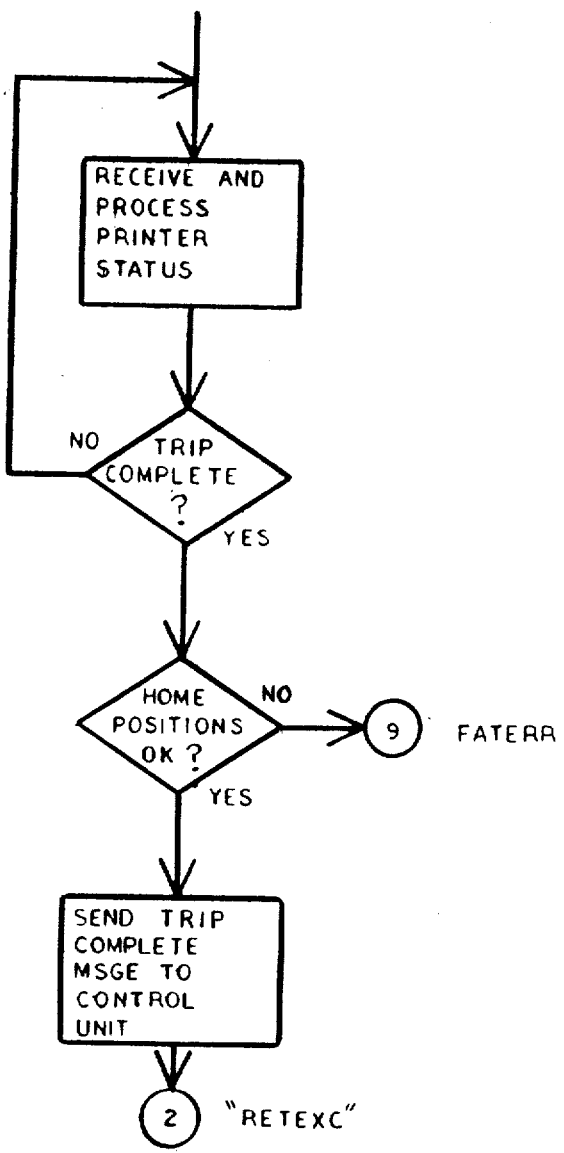

FIG. 15 which comprises FIGS. 15A–15F is a sequential set of flowcharts illustrating the printing unit operation.

FIG. 16 which comprises FIGS. 16A–16L is a sequential set of flowcharts illustrating the accounting unit operation.

Figure 1:
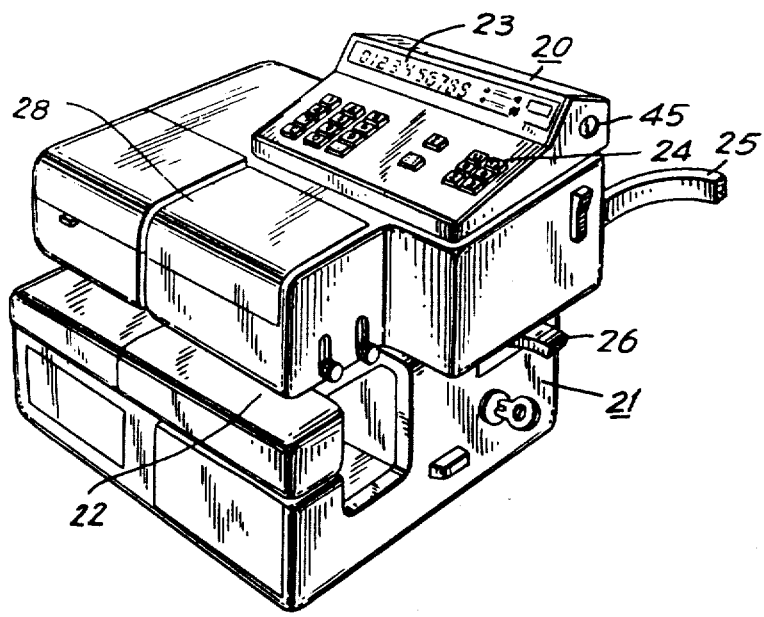
FIG. 1 is a simplified perspective view of a postal meter which may incorporate the system of the present invention.

Referring now to the drawings, and more in particular to FIG. 1, therein is illustrated a postage meter 20 removably affixed to a base 21, in accordance with one embodiment of the invention. In this arrangement, a slot 22 is provided between the postage meter 20 and the base 21 at the forward edge thereof, for receiving envelopes or the like and the printing of postage thereon. The postage meter is provided with a display panel 23, preferably an electronic display device, as well as a control panel 24 which may be organized in a manner to be disclosed in the following paragraphs. The apparatus may be energized by way of a supply cable 25.

The postage meter 20 illustrated in FIG. 1 may be of the type that is removable from the base 21, and the base 21 may be of the type disclosed, for example, in U.S. Pat. No. 2,934,009, Bach, et al, incorporating a mechanical drive for operation of the printing mechanism in the meter 20. The separability of the meter and base renders the electronic meter compatible with conventional driving units, simplifies servicing of the device and, if necessary, simplifies transport of the meter for recharging if remote charging capabilities are not employed.

Figure 2:
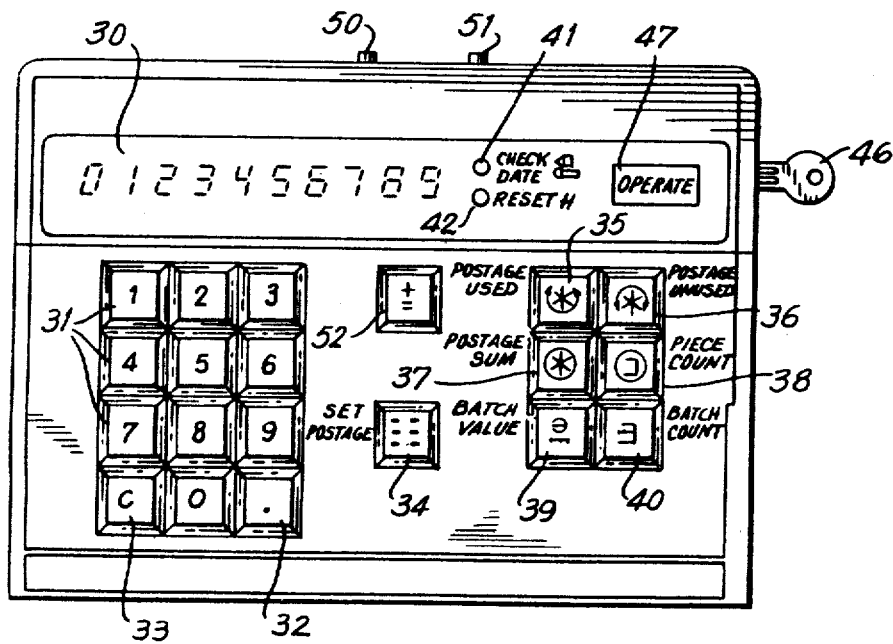
FIG. 2 is an enlarged view of the panel of the postal meter of FIG. 1.

The panel for the postage meter is more clearly illustrated in FIG. 2, wherein it is seen that the meter is provided with a numeric display 30, for example, a conventional multiplexed seven-segment LED or LCD display. In addition, the keyboard is provided with numeric setting keys 31 and a decimal key 32 operative therewith, for setting the meter to print a desired amount of postage, the amount normally being displayed on the display 30. A clear key 33 may also be provided to clear the display amount in the event, for example, of an erroneous entry. When the displayed amount has been set to the desired value, depression of a set postage key 34 effects setting of the print wheels for setting postage.

The panel may further be provided with a series of keys enabling the selective display of other values on the display 30. For example, depression of a key 35 may enable the display of the contents of an ascending register, i.e., the postage used by the meter, and depression of a key 36 may enable display of the contents of a descending register in the meter, i.e., the postage for which the meter is still charged. Further keys 37–40 may enable display in conventional manner of other specific specialized values as control or postage sum, piece count, batch value, and batch count, respectively. The batch value and batch count registers can be cleared by simultaneous depression of either batch value key or batch count key and the clear key C. The panel additionally preferably is provided with an LED 41 which will be lit upon each application of power to the meter, as is conventionally done at the beginning of a day, to indicate that the dater has not been set or that the dater door is open. A further LED display 42 may be provided and interconnected to be lit if necessary to reset the trip mechanism in the base before operation is to continue.

In order to provide recharging of the meter, for example, by way of the keyboard, the meter may be provided with a key slot 45 illustrated in FIG. 1, in which the key 46 of FIG. 2 may be inserted. The shaft of the lock may be visible through a window 47 to display the position of the key. Thus, in the normal setting of the key this shaft may display the message "operate" as illustrated. This arrangement may also be employed for remote meter resetting, as discussed, for example, in U.S. Pat. No. 4,097,923.

As a further feature, the meter may be provided with a service switch 50 at the rear thereof for the convenience of field service personnel enabling use of the keys of the meter for different functions. Upon operation of the switch 50, the keys 35 through 40 may thereby enable the display of additional values such as the unlock value, the low postage warning amount, the meter number, diagnostic status, and the maximum settable amount. Turning the switch to an "enter combination" position, as indicated in the window 47, while entering a correct coded combination in the keyboard, enables the recharging mode of the meter to be effective. In the charging mode, which may be attained by means of an internal switch lock controlled by the key 46, an "enter amount" position as shown by this message at the window 47, may enable entry of recharging value registers of the meter by way of the keyboard. Returning the key to the operate position enables the resumption of the use of the meter for printing postage.

The service switch may be in an unsecured position in the meter, since the display of the additional values rendered possible by the use of this switch does not affect the security of the meter, and merely enables the display of further values. The fact that it is these values that are being displayed may be shown by distinctive underlining of the display, if desired, and the operation of the service switch 50 partially disables the set postage key 34. It will then not be possible to set a new value of postage in the postage meter when it is in the "service" mode and the interposer will act to block operation of the meter in the service mode. However, the set key may still be used to cause the display of the currently set value.

When the meter is in the service mode, i.e., with the switch 50 operated, and the switch 45 and key 46 activated, the entry into the keyboard of a new value and a code indicating the function of that value, will enable the resetting of the unlock value, low warning postage amount or maximum settable amount, respectively. The "unlock" value is a determined value, for example, one dollar, including and above which the operator should be careful in setting so as to avoid accidental printing of excessive amounts. For this purpose, all values including and above the unlock value require an additional step on the part of the operator, such as an additional depression of the set postage key 34. The display may be provided with a distinctive indication, for example, one horizontal bar, to indicate that the printing wheels have been set but the unlock step, i.e., the additional depression of the set postage key, has not been effected. The completion of the unlock step would be indicated by the display, for example, of three horizontal bars to indicate that the meter is enabled to be tripped, to print postage.

If the descending register does not contain sufficient funds to cover the set amount on the print wheels, the entire display may be caused to blink. On the other hand, if the value stored in the descending register is lower than the low postage warning limit, the decimal point may be caused to blink. The "maximum settable" amount, of course, cannot be exceeded in the setting of any postage.

The meter may also be provided with a "privileged" switch 51 that is normally held in the operate position by a seal. The operation of this switch, following the cutting of the seal, enables the recharging of the meter by post office personnel in a nonremote charging mode.

In addition, the meter is provided with one or more arithmetic function keys 52, enabling a variation of the postage setting amount, such as the addition of further values to the already displayed setting value prior to the depression of the set switch 34. This feature enables the introduction by the operator of further values, such as insurance or the like, without the necessity for manual calculation or calculation on a separate device.

Figure 3:
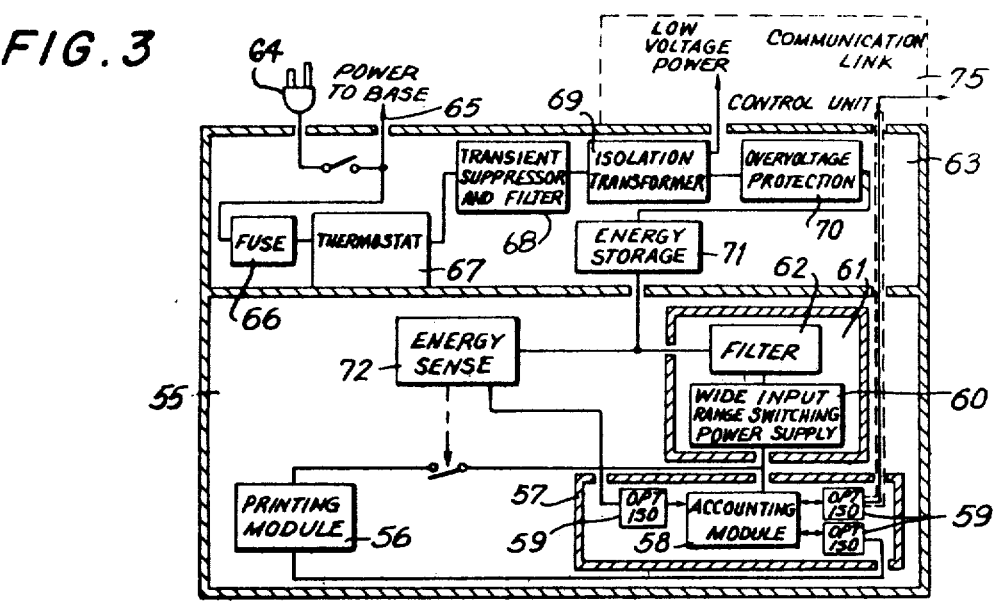
FIG. 3 is a simplified block diagram of the orientation of the elements in accordance with a preferred embodiment of the invention.

The internal components of the postage meter in accordance with the invention are preferably oriented as illustrated in FIG. 3, and include a first compartment 55 that is physically secure, i.e., as secure as is reasonably possible to avoid tampering with internal components thereof. While it may not be possible to provide 100% security in this regard, physical evidence of tampering will be evident in any event before entry can be gained. The compartment 55 encloses the printing module 56, which may include a mechanical printing assembly, and if desired, a separate microcomputer for controlling this module.

The compartment 55 also encloses a further compartment 57, which is preferably electromagnetically shielded, and encloses an accounting module 58. The accounting module is connected to external devices, i.e., external of the compartment 57, only by optical or similar isolation couplers 59 as disclosed in U.S. Pat. No. 4,310,754, a continuation in part on application Ser. No. 918,785 filed June 26, 1978, in order to avoid damage thereto, either accidental or intentional resulting from introduction of noise, for example, excess voltages into the accounting module. Such coupling is, of course, not provided for the energy source thereof, which extends to a power supply 60 in a separate compartment 61 also within the secure compartment 55. The power supply 60 is energized by way of a filter 62 within the compartment 61, to insure the absence of any voltage variations that would adversely affect the accounting module, the power input to the compartment 61 being directed into the compartment 55 from a power supply system in a further compartment 63 that is preferably defined by the outer secure housing of the compartment 55. Thus, while it is not absolutely necessary for all the elements within the compartment 63 to be physically secure, this feature is preferred.

The power from the mains plug 64 is fed into the compartment 63, from where it may be fed by way of a suitable connection 65 to power the meter base. The power for the meter may be fused in the compartment 63, by means of a fuse 66, applied from the fuse to a thermostat 67 and thence to a transient suppressor and filter 68. The thermostat inhibits application of voltage to the unit in the event of excess temperatures. Further protection for the system is provided by means of an isolation transformer 69 and an over voltage cut-out device 70. The power for the meter is finally applied to an energy storage device 71, such as a large valued capacitor 71, the capacitor 71 having adequate energy storage to enable the self-protection features of the meter to operate, such as to transfer data to a nonvolatile memory, in the event of a power failure. The reduction of voltage may be sensed by a sensor 72 in the secure housing 55, with one output of the sensor being directed to the accounting module for signaling the necessity of a mode change, and another output (which can be mechanical) for inhibiting further printing module functions.

A further output of the isolation transformer 69 may be fed externally of the meter to a control unit 75, and one of the isolated outputs of the accounting module may be directed through the chamber 63 also to the control unit. The control unit 75 may thus constitute a keyboard control unit such as illustrated in FIG. 2, including the key switches, displays, etc., necessary for local operation of the device. It is thus apparent that the system of FIG. 3 orients the elements of the postal meter so that elements which are less critical to the security of the postal meter system are provided with successively lower levels of physical and electrical security.

Figure 4:
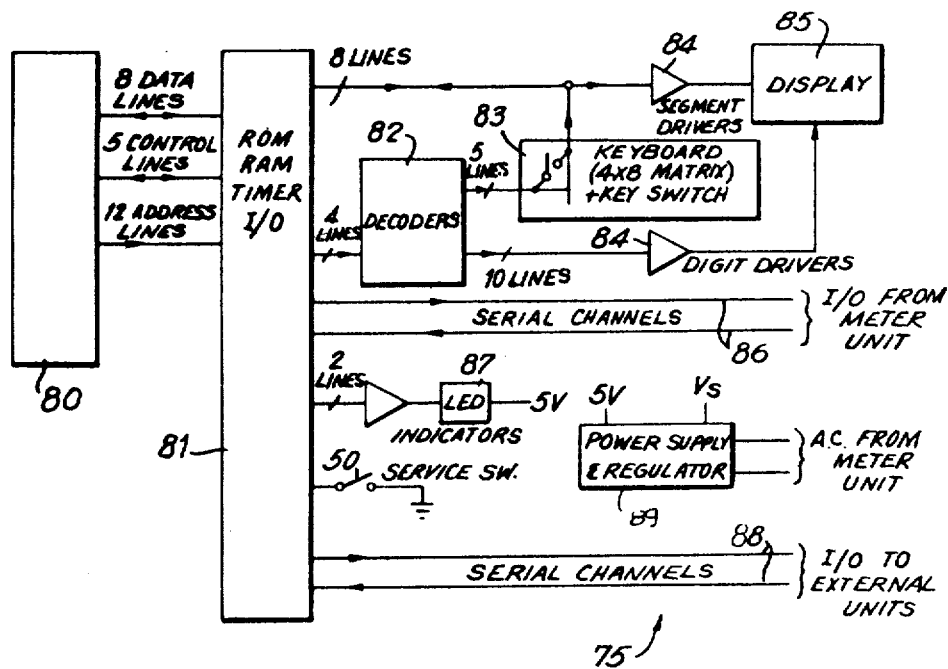
FIG. 4 is a simplified diagram of the circuitry of a control unit for a postal meter in accordance with the invention.

A preferred embodiment of a control unit 75 is illustrated in FIG. 4. This unit, for versatility in design, as well as for minimizing the noncritical elements that must be isolated in the physically secure housing, preferably incorporates a central processing unit 80, for example, of the 6500 series, and connected by way of conventional data lines, control lines and address lines to a multipurpose conventional RAM/ROM I/O timer circuit 81 incorporating read-only memories, random access memories, timing control elements and input/output interface hardware. By the use of suitable decoders 82, the keyboard 83 may thereby be scanned in the conventional fashion, and by the use of suitable drivers 84 the visual display 85 may be energized, preferably in a multiplexing mode according to conventional practice. The data relating to the depression of any of the keys of the panel may thereby be communicated to the processing unit 80, for the development of a serial input/output on the lines 86 for communication with the accounting module 58 within the secure housing 55. The processor 80 and circuit 81 are responsive to the requirement for operator intervention to recock the trigger mechanism in the base, and the failure to open or close the dater door 28 (FIG. 1) following application of power to the unit, to energize selectively an indicator LED 87 corresponding to the indicators 42 and 41, respectively, of FIG. 2. The service switch 50 may also be connected to the circuit 81. If further input/output devices are coupled to the control unit, such as external display devices or control systems, these may be coupled to the unit by way of further input/output lines 88, preferably serial communication paths which may be suitably isolated by opto isolators. The unit may comprise an internal power supply and regulator 89 connected to receive power from the postage meter low voltage power as shown in FIG. 3.

The above-discussed functions under the control of the control unit are thus functions which are not critical in the sense that loss of control or the contents of any register therein will not result in loss to the post office department, or to the user, of funds. These functions have been relegated to the control unit in order that the secure portions of the postal meter include only that programming of the system which must be secure. Additional functions that may be effected by the control unit, such as the addition of sequentially entered amounts may also be controlled by the program of the control unit, since such calculations are not critical to the security of the apparatus, and need not be effected within the physically secure portions of the postal meter. Similarly, the service resettable functions may be effected by the programming in the control unit, since these functions also are not critical to the accounting system and registers themselves. However, to retain these parameters in nonvolatile memory, retention in the accounting unit is desirable.

It will, of course, be apparent that, in a system such as shown in FIG. 4, further arithmetic keys may be provided, without great difficulty, such that the postage meter may be alternately employed also as a calculator.

Alternatively, the central processing unit and its control circuit may be augmented by a calculator chip or the like, connected to the keyboard and display for performing arithmetic functions.

While the control unit of FIG. 4, including all of the functions of the panel shown in FIG. 2 is preferably disposed directly on the postage meter to form a part thereof, it will be apparent that this portion of this system may be physically separate therefrom, or separable therefrom, whereby the postage meter itself may incorporate only the elements that are required to be physically secure.

Since monetary information and control is prevalent in the serial communication employed in the system, a high degree of integrity is mandatory. For this purpose, the system is designed, in the serial transmission communication sections, such that a transmitted bit is returned or "echoed" by the receiver thereof for checking purposes. If the transmitter thereby receives all of the echoed signals satisfactorily, it may issue a "no error" pulse, thereby informing the receiver of the information that the received information is valid.

Figure 5:
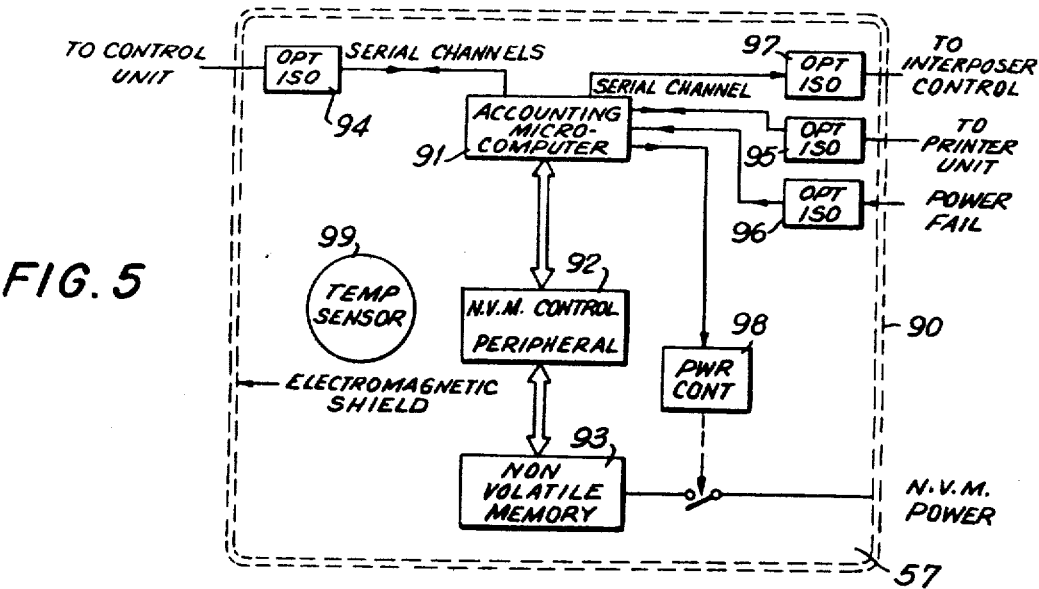
FIG. 5 is a simplified diagram of a circuit for the accounting system of a postal meter in accordance with the invention.

The circuit arrangement of the accounting compartment is shown in somewhat greater detail in FIG. 5, wherein the walls 90 of the compartment are illustrated as preferably forming an electromagnetic shield. The circuits include an accounting microcomputer 91 having a nonvolatile memory control 92 coupled thereto. The nonvolatile memory control controls the application of stored data between a volatile memory, which may form a part of the accounting microcomputer 91 and a nonvolatile memory 93. The volatile memories, such as random access memories, may function as working ascending registers, working descending registers, and the like. The accounting microcomputer also includes read-only memory control for the necessary accounting routines, as well as control routines. This unit may, in addition, incorporate serial interfaces, to enable its interfacing with the printing and control modules. The microcomputer may, for example, comprise the 8048 series microcomputer from Intel Corporation, Santa Clara, California, with a control circuit in a manner similar to that described above with respect to the control unit 75. In order to avoid damage to the accounting module by electric surges applied accidentally or intentionally, and to eliminate electrical noise induced via groundloops, the accounting microcomputer communicates with the devices external of the compartment 57 by suitable isolators that are not capable of applying voltage surges to the microcomputer. These isolators may, for example, be in the form of opto-electronic couplers, and are also preferably arranged so as to be inaccessible from the exterior of the postal meter. One isolator unit 94 may be provided for the two-way communication path with the control unit. A further isolator arrangement 95 may be provided for the two-way communication with the printer unit, i.e., the printing module 56 of FIG. 3, in particular, the microprocessor circuit thereof. A still further isolator 96 may be provided for applying the power sensing signals to the microcomputer 91. In addition, an isolator 97 may be provided for controlling an interposer (not shown) in the printing module, for example, for mechanically blocking functions of the printer. Such a system is disclosed, for example, in U.S. Pat No. 4,253,015 filed Mar. 28, 1979 by R. McFiggans and A. Eckert, and assigned to the assignee of the present invention, the disclosure of which is specifically incorporated herein by reference.

The nonvolatile memory 93, at the present state of the art, is preferably in the form of an MNOS memory, which does not require a back-up power source. This memory may, however, alternatively be formed of elements which do require a power back-up, in which case a power control circuit may be employed to apply back-up power thereto external from the compartment 57. The purpose of the power control circuit 98 is to provide power to the MNOS memory for the purpose of effecting its data transfer operation, essentially during power up and power down. The program of the microcomputing unit 91 is organized to enter the contents of the registers of the computer units into the nonvolatile memory as soon as any indication of failure of the power supply occurs, and to restore this data to the working registers upon restoration of the power.

The thermostat 67 in FIG. 3 cuts off power to the meter in the event of high or low temperature operation. This automatically places the meter in its power down cycle, as a result of the power cut-off.

The compartment 57 may further comprise a temperature sensor 99, with suitable circuits (not shown) coupled thereto, such as to the microcomputer, for transferring data to the nonvolatile memory in the event of excess temperatures. The system may further be operative to prevent the operation of the interposer solenoid by way of the isolator 97, in the event of excess temperatures. It will be appreciated that the interposer is controlled by the microcomputer 91 also to inhibit operation of the printer in the event that insufficient postage remains for a printing operation, or other accounting data indicates that the unit should not be operative.

While the isolators have been indicated as individual units, it is, of course, apparent that these units may incorporate multiple devices, so that two-way communication is established in the respective circuits. It is further noted that systems for the transfer of data between volatile and nonvolatile memories are well known, and are disclosed, for example, in U.S. Pat. No. 4,224,506.

Figure 6:
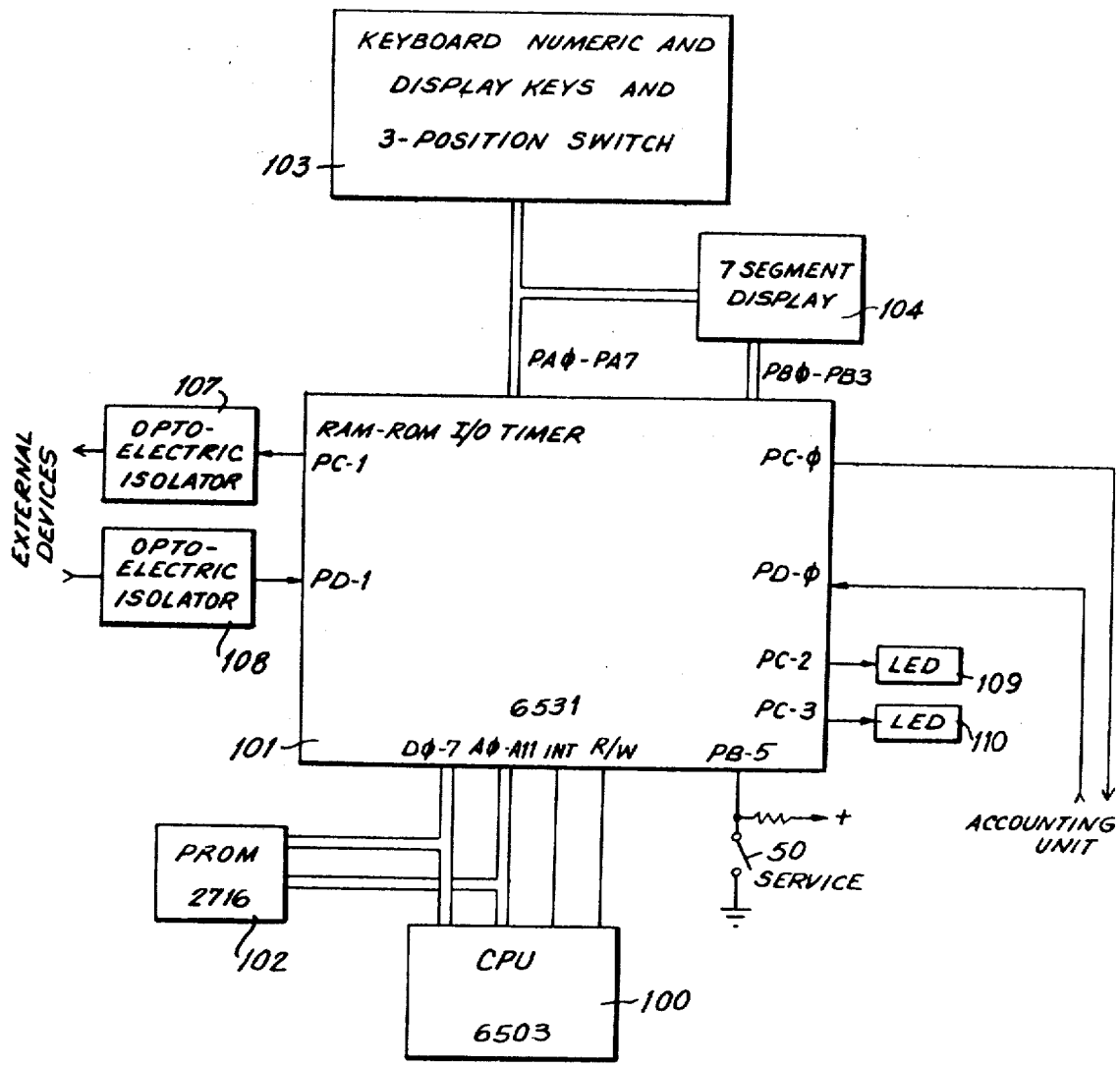
FIG. 6 is a more detailed block diagram of a preferred embodiment of the control unit for a postal meter in accordance with the invention.

Referring now to FIG. 6, therein is illustrated in greater detail a block daigram of a preferred embodiment of a control unit in accordance with the invention. In this figure the blocks have been identified by part numbers and terminals where applicable. This unit is illustrated as incorporating a type 6503 CPU 100 having its data and address lines coupled to RAM/ROM I/O timer circuit 101 as well as to a type 2716 PROM 102, the PROM 102 having stored therein the program for the control unit. Control lines, such as the interrupt line and read/write line may also be connected to the circuit 101. The circuit 101 has a plurality of ports, as will be discussed.

The control unit further incorporates the keyboard 103 including the numeric keys 31, the display keys 35-40, and the three-position switch 45 shown in FIG. 1. This unit also includes the add-through key 52 and the set postage key 34. All of these keys and switches are connected in a matrix to the circuit 101, in conventional manner, to permit the scanning of the keys and switches in accordance with the program, to detect a key or switch closure. The eight-line port A, as well as four lines of port B of the circuit 101, are also connected to the seven-segment display panel 104 for multiplexed display in the conventional manner. The circuit 101 is further connected by a pair of serial ports for communication to and from the accounting unit. In addition, a pair of further serial ports enable communication to and from external devices, by way of opto-electric isolators 107 and 108, respectively. Another output port of the adaptor is connected to LED 109 for indicating on the display panel that the dater door has not been closed. A further output port is connected to an LED 110 on the display panel for indicating that the operator's intervention is required to recock the trigger mechanism on the base. Finally, another port is coupled to the service switch 50, to enable the functions of the postal meter in the service mode.

In the preferred embodiment of the invention, the program of the control unit is directed to servicing of the keyboard unit, display panel, etc., so that the control functions and storage of data are effected primarily in the accounting unit. The program thereby includes those functions necessary for the scanning of the keyboard, multiplexing of the display, formatting of signals for communication with the other units, and with external devices, etc., so that any new information may be passed on to the accounting unit.

Figure 7:
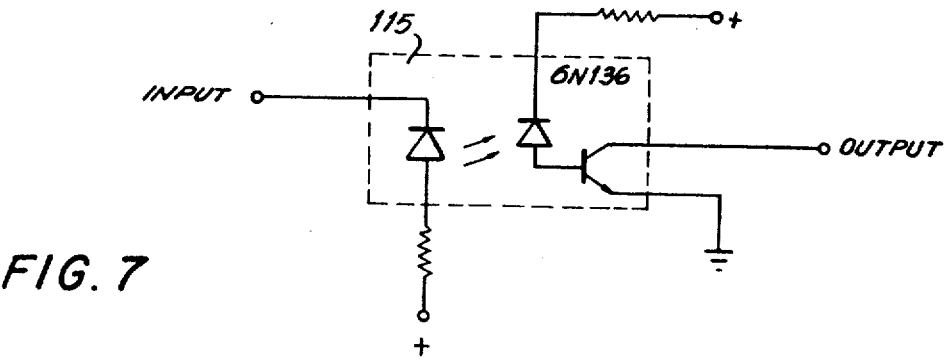
FIG. 7 is a circuit diagram of an opto-electric isolator that may be employed in the present invention.

A typical opto-electric isolator is shown in FIG. 7, this constituting primarily a conventional 6N136 device 115 including a solid state emitter for producing optical signals for reception by a photodiode, the photodiode being connected in the base circuit of a transistor amplifier.

Figure 8:
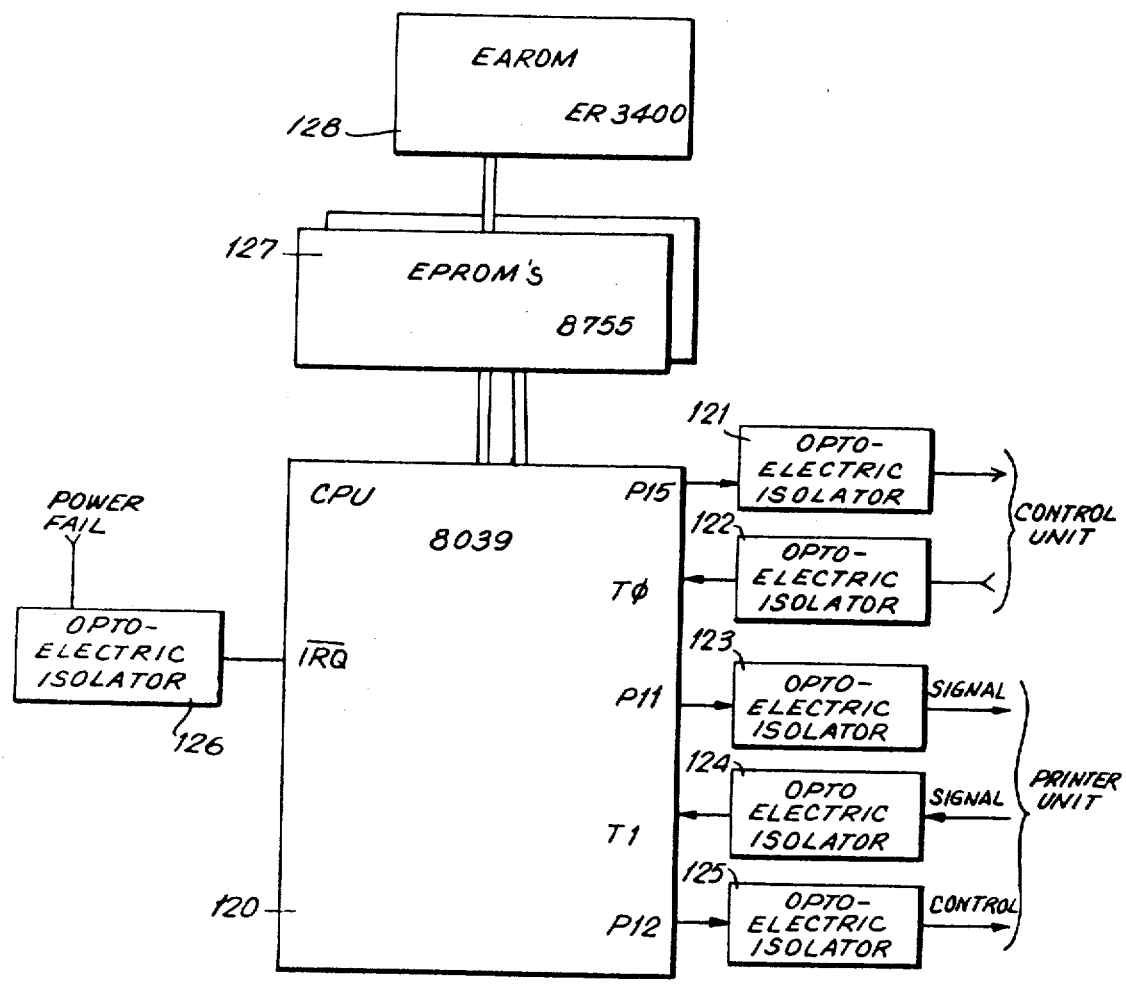
FIG. 8 is a more detailed block diagram of a preferred embodiment of an accounting unit in accordance with the invention.

A block diagram of a preferred example of the accounting unit is illustrated in FIG. 8, wherein a type 8039 CPU 120 is shown to communicate with the control unit by way of opto-electric isolators 121 and 122, and to communicate serially with the printer unit by way of opto-electric isolators 123 and 124. The opto-electric isolators 121 and 122 within the accounting unit thus may be connected directly to the corresponding leads of the control unit. The isolators 123 and 124 may be connected directly to the printer unit signal channels, since no further isolation devices are necessary for this purpose. In addition, a control opto-electric isolator 125, for controlling an interposer or the like in the printing unit may be connected to a further port of the CPU 120. Signals corresponding to a pending power failure are further fed to the interrupt port of the CPU 120, by way of opto-electric isolator 126. It is thus apparent that all signal and control to and from the accounting unit must be directed by way of opto-electric isolators, in order to insure the electrical and physical integrity of this unit. The accounting unit further includes a plurality of PROMs 127 coupled to the address and data lines of the CPU 120, each PROM 127 for example, being a E-PROM type 8755. This unit is connected to an electrically alterable read-only memory (EAROM) 128, for example, a type ER 3400, serving as a nonvolatile memory to store data at times during which the power supply to the postage meter has failed, or has been intentionally disconnected. The working memory for the accounting system, including the registers for storing all operational data, are provided in the CPU 120, this data being transferred to the electrically alterable ROM 128 at such time that a reduction of power is sensed. In order to insure the complete transfer of data, storage capacitors may be connected in conventional manner to store adequate power to insure the proper functioning of the circuit until the transfer of data has been effected.

Figure 9:
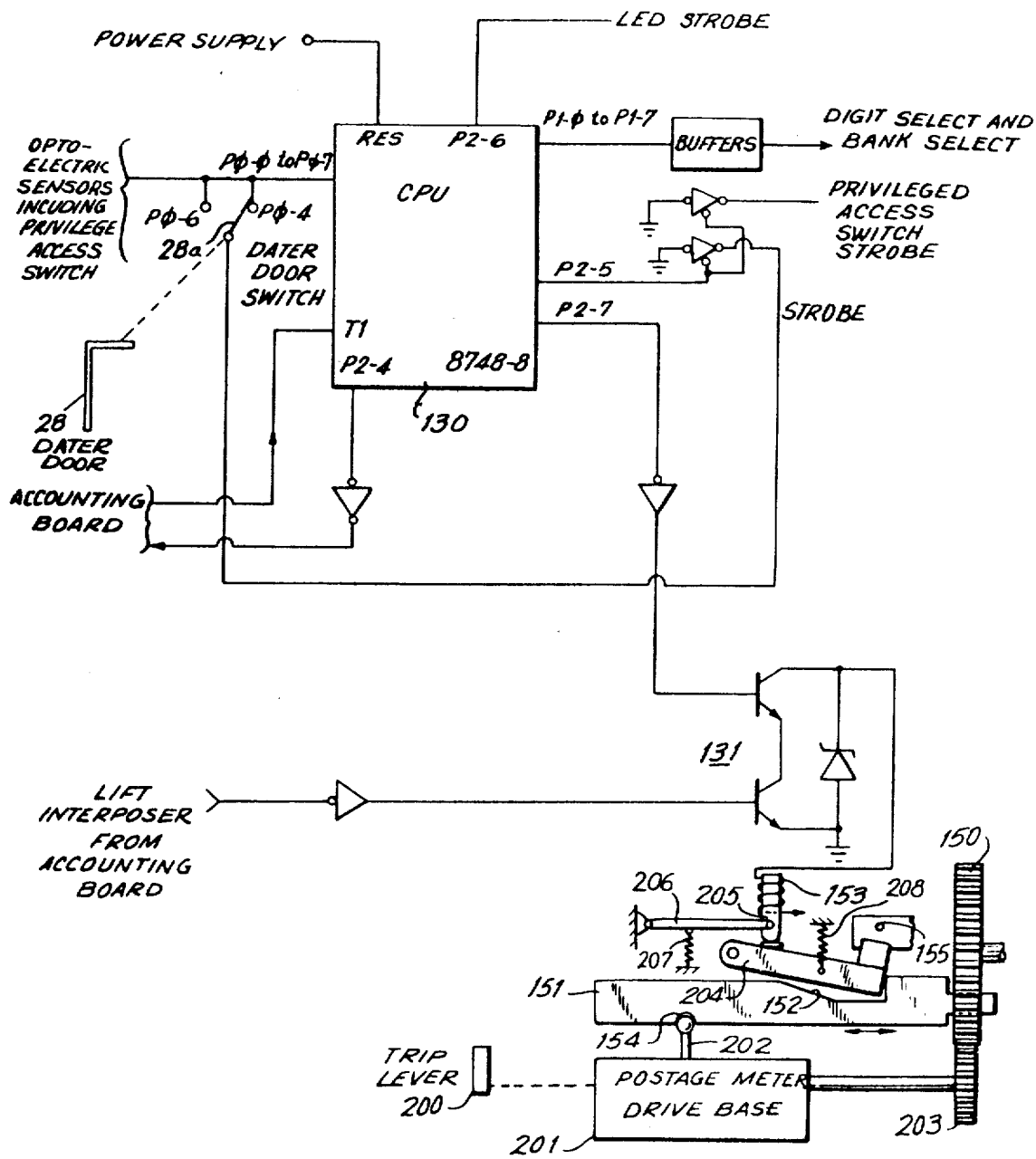
FIG. 9 is a block diagram of a preferred embodiment of the electrical system of the printing unit of a postal meter in accordance with the invention.

A preferred example of the circuit of the printing unit is illustrated in FIG. 9, this circuit consisting primarily of the CPU 130, for example, a type 8748-8, the CPU being connected by way of suitable buffers where necessary, to the I/O devices within the printing unit itself. The mechanical and opto-electric sensing systems in the printing unit are conventional and may be generally of the type disclosed, for example, in U.S. Pat. Nos. 4,050,374 and 4,253,015, the disclosures of which are specifically incorporated herein by reference. Thus, the CPU is connected to a plurality of opto-electric sensors (not shown) for sensing of the positioning of the print wheels, these lines also being connected to enable the sensing of the privileged access switch 51 of FIG. 2. The privileged access switch 51 is located within the printing unit and is accessible only by way of a door sealed by the post office. These lines of the CPU are further connected to sense the position of the dater door, the dater door switch and privileged access switch being strobed by way of a further output of the CPU 130. The LEDs for the optical sensors are strobed at the proper times by way of another output of the CPU 130, and still further outputs of the CPU enable the stepping of the bank and digit stepping motors for the print wheels. In addition, the CPU 130 has a pair of ports for serially communicating to and from the accounting unit. Further, the interposer output from the accounting unit, and another output of the CPU 130 control a pair of transistors 131 for energizing the interposer solenoid, whereby the interposer solenoid 153 is not energized until all the preconditions are met both in the accounting unit and the printing unit. As a result, a printing cycle cannot commence unless the physical and electrical conditions in the meter are correct for normal printing. In the printing unit, it is therefore evident that the program is provided within the CPU itself.

Postal meters of the above-described form may be provided with several modifications. For example, in one modification, a remote charging feature is available whereby the key is provided for operation of the three-position charging switch on the keyboard. The operator of the unit may thus be provided with suitable combination for entry into the keyboard, to enable remote charging (i.e., away from the post office). In such units the privileged access switch is omitted.

In a further modification, the three-position recharging switch on the keyboard may be controlled by a simple knob, without the necessity of a key. In this type of a system, the meter may be manually recharged at the post office, but the service functions may be effected locally in a manner similar to that of remote recharging system type units.

In other words, recharging of a postal meter of the above type can be effected locally, if devices are provided with a key for the three-position switch, in which event further security is required as will be discussed later. On the other hand, in postal meters having a simple knob switch instead of the key switch, the "privileged access", sealed at the post office, is provided for manual recharging.

In the normal mode of operation of the system, as above discussed, the six display keys, when depressed, effect the display on the display panel of the six parameters above noted, i.e., the total in the ascending register of all postage that has been printed, the total remaining in the descending register of postage available, the control sum, the total number of printing operations of the meter, the value of postage printed and the number of pieces that have been printed since the last batch clear operations of the associated registers. The depression of these keys results only in the number of concern being displayed for a timed period after the key is released, for example, two seconds following which the display will return to the postage setting.

In either type of meter, if the service switch is placed in the service position, with the three-position switch still in the operate position, the display function of the display keys will be different. Thus, depression of the "postage used" key 35 will now result in a display of the current value set in the dollar unlock register in the machine, at or above which an operator cannot print postage. Postage values above this value require an additional depression of the set postage key for operation, in order to avoid accidental printing of excessive postage values. Depression of the "postage unused" key 36 will now result in a display of the value in the low postage warning register at which a warning should be given that the contents of the descending register are below a determined amount. Depression of the control or "postage sum" key 37, will now result in the display of the serial number of the postal meter. Depression of the "piece count" key 38 will now result in a display of the diagnostic status of the meter. This display provides an indication to the serviceman of possible misfunctions. A depression of the "batch value" key 39 will now result in a display of the maximum settable amount, i.e., the maximum amount set internally within the meter, above which the meter cannot set the print registers. Depression of the "batch count" key 40 will have no effect in the service mode.

The three-position switch is used to effect recharging of the meter or to effect the change of values in the registers concerned with dollar unlock value, the low postage warning amount and the maximum settable amount.

With the remote recharging feature, positioning the three-position switch in either the "enter combination" or "enter amount" positions enables the customer to enter a combination or amount respectively into the meter via the keyboard with indication on the display. When the three position switch is controlled to leave this position, the display value is entered into the accounting unit and the display is blanked for the next entry. Return of the three-position switch to the operate position will cause the accounting unit to complete the recharging routine and return the meter to normal usage with the recharging amount added to the postage unused register. The combination for the remote recharging feature is obtained from a remote data center and is a random or pseudorandom number which changes with each recharging for security reasons.

For meters with the manual recharging feature, the recharging mode is effected by breaking the seal of the privileged access door, and flipping of the privileged access switch. The same sequence of operations of the three-position switch described above for recharging the meter are followed as in those meters having the remote charging feature. In the manual recharging system machine only post office personnel are permitted to effect the change. The combination is a fixed number known only to the post office and is stored within the meter. Normal operation of the meter may proceed once the privileged access switch has been returned to its operate position.

To change values in the registers concerned with dollar unlock value, the low postage warning amount and the maximum settable amount, the serviceman would place the meter in the service mode by placing the service switch in the service position. The three-position switch is used as described above for the entry of combination and amount values. The meter will interpret the combination value to indicate which register is to be changed.

For the remote recharging system meter and the manual recharging system meter if an error has been made in entry, the occurrence of this error will be counted, as constituting evidence of tampering with the machine. When a determined number of such errors have been made, for example, 9, since the last setting of the meter, then the function of the machine in recharging postage will be inhibited. The return of the meter to operating status in such circumstances may be effected at the post office. A discussion of the means to return the meter to full operating status is not of consequence to the present invention and relates to the security of the meter.

As above discussed, each of the three units of the postal meter has a microprocessor with a read-only memory defining a given program, and the communication between the units is effected serially and asynchronously. This is achieved in the first place by providing each of the computer systems with a crystal controlled clock. Further, the signals are defined such that the transitions thereof are closely controlled, whereby it is insured that, if a signal is present, it must be present within a given time period. As a still further insurance of the correctness of communication, the bits of a signal are returned to a transmitter as soon as they are received, for error checking at the transmitter, whereby a "no error" bit may be transmitted immediately following a data message if the data has followed correctly.

The program of the control unit responds to the status of the postal meter with respect to determined parameters. A register in the microprocessor of the accounting unit holds meter status information, for example, of two bytes, the bits of which digitally indicate if the meter trip mechanism requires recocking, if the dater door has not been opened following the last application of power or is presently open, if there are insufficient funds to allow printing of the amount set in the print wheels, if the low postage value has been reached, if the meter is in a service mode, if the meter is enabled, if the batch registers are clear, if a trip has been completed, or if various types of errors have occurred. The status message associated with these bits is not the same as the diagnostic message noted above that is employed in the service mode. The accounting unit keeps the control unit informed of the current status by transmitting a status message to the control unit after power has been turned on and, thereafter, whenever a change in status occurs. The control unit responds to all such messages by insuring that the display on the meter is consistent with the status message as above discussed. These later steps may include, for example, the display of a row of decimals in the event of certain errors, the flashing of the decimal point in the event of low postage funds, the flashing of the entire display in the event of insufficient postage, and the displaying of underscores in the place of blanks if the meter is in the service mode.

An interrupt program in the control unit interrupts the main program of the control unit at regular intervals in order to scan the keyboard and keyswitch, and to drive the display. In order to prevent the display of spurious characters which can be produced by sneak currents when more than one key is pressed, the interrupt program will cause the display to go blank instead. Such values as relate to time, keyboard, and keyswitch are maintained by the interrupt program for use by the main controller program.

The main program for the control unit includes the initializing steps, program steps for the transfer of messages back and forth between the accounting unit and external devices, and control of the timed display, the checking of the status message to insure that dater door and reset base lights are lit in accordance with the status, responding to the reported positions of keys, and the three-position switch to ascertain changes of state therein so that the control unit subroutine which corresponds to the function defined for such a state or change of state will be executed.

The program of the accounting unit includes initialization procedures to insure that the working registers are brought up to date, and that no postage has been printed that has not been accounted for, as well as a power down processing program to effect the transfer of data to the nonvolatile (electrically alterable) memory in the event that the power is shut down or is failing.

The main program of the accounting unit effects the transmission of the meter status message to the control unit upon request or change in status, determines the effect of any currently entered postage value on the funding data currently registered and makes any necessary variations in the status message. The main program also controls the timing in the accounting unit for receiving messages from the control unit and the printer. The accounting unit program further includes subroutines for processing of signals in the bringing of the registers up to date when postage is to be printed, and for controlling the operation of the system when the meter is tripped. A further subroutine controls the bringing of the meter status message up to date. In addition an error checking routine which involves cyclical redundancy checking is programmed in the accounting unit software. This will be described in further detail below.

The program of the printer unit includes a main program having initializing steps, steps for scanning the sensors and controlling the strobes for the LEDs of the sensors, and the processing of messages for communication with the accounting system. Subroutines are provided for the setting of the postage wheels, to determine if sensor readings are proper, and to determine if any changes have been made in the outputs of the various hardware sensors and switches such as the privileged access and the dater door switch.

With respect to the program for setting the display unlock value, maximum settable amount and low postage amount, as discussed above, the keys effective for such setting in the above-described manner are matrixed in the keyboard and scanned periodically to determine if a change in the status has been effected. The scanning position also occurs with respect to the service switch, in the control unit, whereby the control of any of the keys and switches is communicated to the accounting unit for storage therein and processing. For example, if the service switch is set to its ON position, then the scanning, which is also effective with respect to the three-position switch, enables as a display routine, to enter combination routine or enter amount routine, in dependence upon the position of the three position switch.

In the display sub-routine, the data is a register corresponding to a depressed display key is sent to the control unit for display. In the enter combination subroutine, the next entry into the keyboard is stored, so that the value entered into the keyboard when the three-position switch has been turned to the enter amount position will be entered into the corresponding register in the CPU of the accounting unit, whereby the thus entered value will be effective in future operation of the machine in normal operating procedures. It is, of course, apparent that the testing of the set values during normal operation is effectively made with respect to a value range, for example, a range of postage values less than or greater than the stored amount, so that the necessary indication can be given. The term "indication" as employed in this sense refers to the display. When the entered postage value exceeds the maximum settable amount, the entered value is ignored, and the display returns to its original postal value. The service settable features as above disclosed may also be considered to effect the control of the postal meter to different states, such as a non-operative state, when the maximum settable value has been exceeded, a low value warning state when the low value indication is flashing, and a dollar unlock value state requiring an additional depression of the set key when the amount set in the display exceeds this stored value.

With further respect to system diagnostics, briefly referred to above, two basic error checks are provided in the software routine of the meter. These two checks are termed fatal and procedural, respectively. Under the category of fatal error checks, two sub-categories are defined. These two sub-categories are termed hard and soft, respectively. Hard errors are determined by monitoring hardware sensors, such as the bank and digit select sensors, interposer position sensors, shutter bar sensor, and the like. A failure of these sensors to prove proper readings will be termed a fatal hard error, will lock up the meter and will be non-recoverable upon power-up. Central authority intervention will be required to permit further operation of the meter.

Another example of a fatal hard error is a resulting non-compare from a cyclic redundancy check. Each data register is continually monitored. Using standard polynomial techniques, a cyclical redundancy remainder is calculated for each updated data register value. When a power-down cycle is initiated, the contents of each data register and its associated cyclical redundancy remainder is transferred to non-volatile memory. Upon power-up, the cyclical redundancy remainder of each data register is again calculated and compared to the cyclical remainder previously calculated upon power-down. A non-compare will produce a fatal error.

Fatal soft errors relate to the intercommunication capability of the meter units. Thus, communication errors between internal units such as the accounting, printer and control units will be sensed, based upon the bit retransmission previously described. In addition, communication time-out functions are provided, so that the failure of a unit to communicate within a specified period will also produce a soft fatal error. Soft fatal errors will block meter operation. Unblocking can be effected by recycling the meter; that is to say, the meter is turned off, then on again, thereby causing recycling and clearing the error. The power recycling will be counted in a data register and, as noted above, upon reaching a predetermined number, could cause total lock up if desired. In other words, a predetermined number of soft fatal errors equals a single hard fatal error.

Procedural errors, such as improper, for example, (high) value entries, or an attempted improper procedure, manifest themselves as visual flags on the display.

Other diagnostic checks, as well as variations as set forth above, may be easily accommodated within the software routines implemented herein.

By allowing data to be communicated between units on a message basis, serially, and by employing the "echo" technique previously described, the implementation of the foregoing error checking capability is achieved expeditiously.

As above discussed, the inter-unit communication is serial channel, bit synchronous, charter asynchronous, start/stop communication, for example at 9600 baud. The communication is solely on the basis of messages, i.e., separate control lines are not provided between the units for control of the communications. This type of communication is also provided for with respect to communications between the control units and external devices. The messages are 10 bits long, each including a start bit followed by an 8 bit word, or byte, and terminating with a stop bit. The last stop bit of a message has a sense opposite to that of all other stop bits of the message, in order to indicate the end of the message. A logical zero is indicative of a start bit, an end of message bit, and a data zero or low. A logical one is provided for a request to send, a clear to send, an end of byte, a data one level, and also as the presence of a no-error pulse. The first word of any message has a coded two-bit field stating whether the message contains information, data or control functions. Another bit of the first word indicates whether or not the message concerns the display only, or if it only concerns the accounting unit. The remainder of the bits of the first word are specific message identification bits.

If the messages have more than one word, the second word of the message may contain a format byte, consisting of two nibbles, i.e., four-bit groups. The first word of any message has a coded two-bit field stating whether the message contains information, data, or control functions. Another bit of the first word indicates whether or not the message concerns the display only, or if it only concerns the accounting unit. The remainder of the bits of the first word are specific message identification bits.

If the messages have more than one word, the second word of the message may contain a format byte, consisting of two nibbles, i.e., four-bit groups. The first nibble tells the number of nibbles of data in the message, and the second nibble gives the number of digits to the right of the decimal point of the data, or corresponds to a hexadecimal F if there is no decimal point.

When a message is ready to be sent by a unit, the receive line of the unit is first tested. If it is low then the transmitting device raises its send line to a high, and again tests the receive line. If it is still low, the unit is free to transmit, otherwise, it must become a receiver. This avoids contention between two units. With respect to units of the postage meter itself, the programs of the different units, in the event of possible contention, give priority to the printer unit, accounting unit, control unit or external device in descending order. When external devices are interconnected with the postage meter, i.e., to the control unit, the control unit is given priority.

Figure 10:
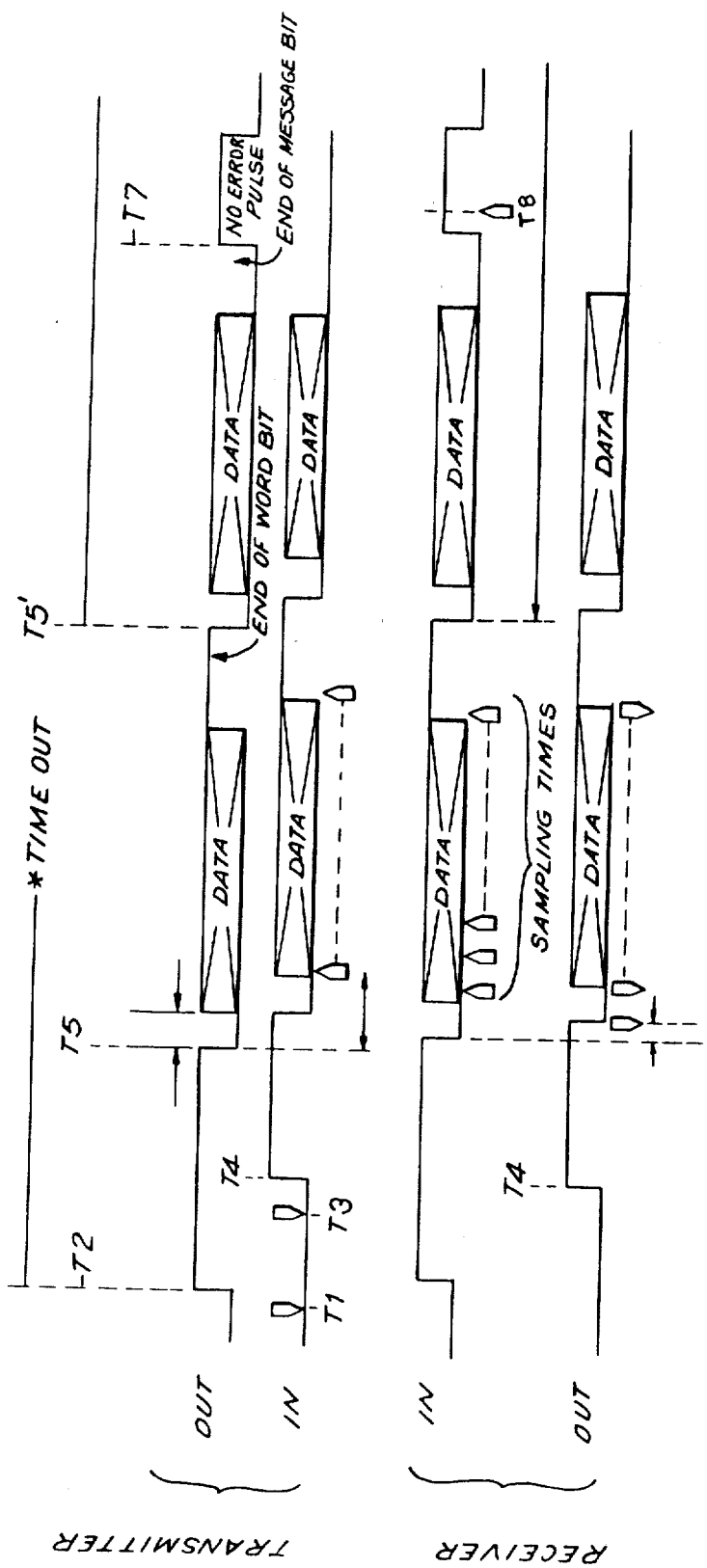
FIG. 10 is a timing diagram illustrating the re-communication operation of the invention.

The timing of the messages constitutes the crux of the communication system whereby the messages may be asynchronous. Typical timing is thus illustrated in FIG. 10, which illustrates the relative timing of the lines of the transmitter for sending a given message, and on the lines of a receiver for receiving the same message. Since the transmitter output line is the same as the receiver input line, it will be evident that these two signal lines are identical. The same is true, of course, with respect to the transmitter input line and the receiver output line.

In a successful transmission system of this type, the transmitter tests its input line at time $t_1$ and, if a low is detected, raises its output line to a high within 50 microseconds, as shown at $t_2$. The transmitter then again tests its input line at time $t_3$ within 50–100 microseconds. If the input line is still at a low then the transmitter can start to send its message at time $t_5$ following a minimum wait of 120 microseconds, by the lowering of this output line to form the start bit of the message. In the meantime, at time $t_4$, the receiver has raised its output line to a high level in a minimum of 100 microseconds indicating it is ready to receive data. This indicates a "clear to send" condition. The timing between the succeeding bytes of a multibyte message, as indicated by the time interval between $t_5$ and $t_{5'}$ is 1134.375 minimum, in order to insure that the receiver has enabled to effect proper reception and storage of the signals.

The time from the beginning $t_{5'}$ of the last message byte and the transmission of a no-error pulse at time $t_7$ is set at 1031.25 to 1157.291 microseconds, and the no-error pulse has a width from 309.375 microseconds to 368.228 microseconds. The receiver must test for the occurence of a no-error pulse at time $t_8$ from 1187.291 to 1340.625 microseconds following the initiation of the start pulse of the last byte of the message. The transmitter bit transitions must be in accordance with table I, and the receiver sampling of the data and stop bits must be in accordance with the timing illustrated in table II.

TABLE I

| n | BIT | MINIMUM | MAXIMUM |
|---|-----|---------|---------|
| 1 | START | 0 | 0 |

TABLE I-continued

| n | BIT | MINIMUM | MAXIMUM |
|---|---|---|---|
| 2 | DATA 1 | 103.125 | 105.208 |
| 3 | DATA 2 | 206.250 | 210.417 |
| 4 | DATA 3 | 309.375 | 315.625 |
| 5 | DATA 4 | 412.00 | 420.833 |
| 6 | DATA 5 | 515.625 | 526.042 |
| 7 | DATA 6 | 618.750 | 631.250 |
| 8 | DATA 7 | 721.875 | 736.458 |
| 9 | DATA 8 | 825.000 | 841.667 |
| 10 | STOP | 928.125 | 946.875 |

TABLE II

| n | BIT | MINIMUM |
|---|---|---|
| 1 | START | — |
| 2 | D1 | 115.208 |
| 3 | D2 | 220.416 |
| 4 | D3 | 325.624 |
| 5 | D4 | 430.832 |
| 6 | D5 | 536.040 |
| 7 | D6 | 641.248 |
| 8 | D7 | 746.456 |
| 9 | D8 | 851.664 |
| 10 | STOP | 956.872 |

With the above timing, and the use of crystal control for the clock of each of the units, asynchronous transmission is thereby feasible so that control leads for this purpose between the units are unnecessary.

Further, in accordance with the invention, in order to insure that the information is correctly received by the receiver without error, the data is sequentially returned to the transmitter on the receiver output line. The times for the retransmission of the data, from the beginning of the instruction loop detecting start bit, are given in table III, and the times for sampling this data on the input line to the transmitter are given in table IV.

If, and only if the received data at the transmitter is the same as the sent data, will the no-error pulse be transmitted at the end of the message.

As a further control over the message communication, the transmitter will wait for 3.5 milliseconds for a clear to send signals from the receiver after presenting a request to send transmission, and similarly, the receiver will wait for about 3.5 milliseconds maximum for the start of a message after presenting the clear to send message. Contention between units is further minimized by setting determined periods that must be existent between adjacent transmitter activity of a unit, as well as between adjacent receivers.

TABLE III

| n | BIT | MINIMUM | MAXIMUM* |
|---|---|---|---|
| 1 | START | 32.083 | 73.125 |
| 2 | D1 | 137.292 | 176.250 |
| 3 | D2 | 242.500 | 279.375 |
| 4 | D3 | 347.708 | 382.500 |
| 5 | D4 | 452.917 | 485.625 |
| 6 | D5 | 558.125 | 588.750 |
| 7 | D6 | 663.333 | 691.875 |
| 8 | D7 | 768.542 | 795.000 |
| 9 | D8 | 873.750 | 898.125 |
| 10 | STOP | 978.958 | 1001.250 |

*Allows 10 usec for program loop uncertainty in detecting start pulse. If uncertainty is greater than 10 usec the excess should be subtracted from each maximum value.

TABLE IV

| n | BIT | MINIMUM | MAXIMUM |
|---|---|---|---|
| 1 | START | 103.125 | 135.208 |
| 2 | D1 | 206.250 | 240.416 |
| 3 | D2 | 309.375 | 345.625 |
| 4 | D3 | 412.500 | 450.833 |
| 5 | D4 | 515.625 | 556.041 |
| 6 | D5 | 618.750 | 661.250 |
| 7 | D6 | 721.875 | 766.458 |
| 8 | D7 | 825.000 | 871.667 |
| 9 | D8 | 928.125 | 976.875 |
| 10 | STOP | 1031.250 | 1082.083 |

All control and data signals utilize the same pair of conductors in each direction with precisely defined timing for control.

For providing external control, the control flow is in one direction and information flow in the other direction.

All control of the meter and all information inside the meter can be controlled by connection through an interface connector along lines 88, FIG. 4. All functions performed by the meter are controllable electrically from a remote location, except purely local manual functions such as power on and date change. This results from the communication capability of the data units. The software routine will scan for the presence of an external control device, and permit subrogation of control to such external device upon recognition of its validity. The organization of the three units results in a flow of commands or control of data from the control unit to the accounting unit and then to the printer unit. A new value of postage, and where it is to be set, is one example of such data and command. The flow of information is in the opposite direction, such as, for example, a current register value of the like. Within this concept, connection of an external device, such as an electronic scale into the control unit, can operate to place commands or data control instruction information into the meter. The interface operation allows the external device to take control of the meter, including the disabling of the keyboard of the control unit, if desired. The external device interfaces with the meter on a message basis. The external device can send messages to be displayed, or can send messages requesting the contents of the display. The control unit programming will permit the external device to send a message disabling the keyboard, thereby implementing the subrogation function. One specific advantage of the foregoing arrangement is that the control unit may be physically replaced by an attached external operating device, without any changes in the accounting unit or the printing unit, either in hardware or software.

Figure 11:
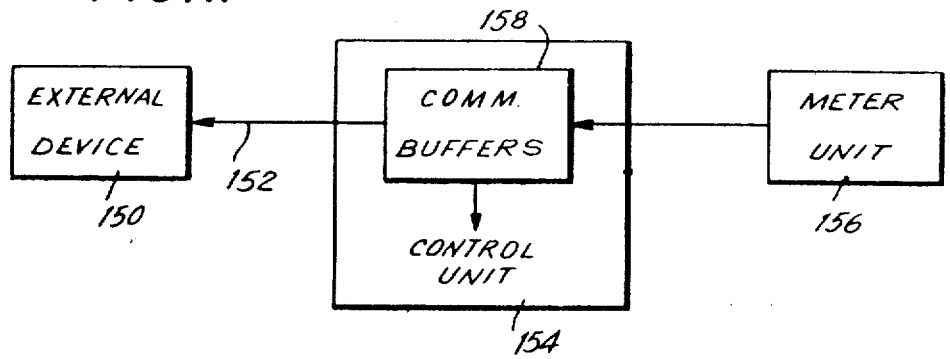
FIG. 11 is a logic diagram illustrating transmission from the meter.
Figure 12:
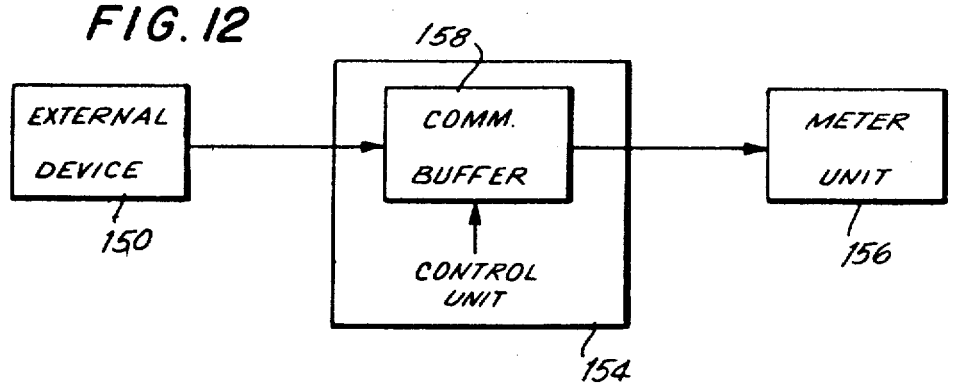
FIG. 12 is a logic diagram illustrating transmission to the meter.

The external device can include a plurality of operating devices, such as a scale and a remote display. The control unit microprocessor can be used to function as a message buffer to allow for flexibility in the development and use of external devices. External devices may include weighers, displays, or other type of device normally interfacing with meters of the type disclosed herein. The software provided in the control unit can be implemented for this function. As shown in FIG. 11, an external device 150 may be used to replace or supplement the control unit function. The external device 150 is preferably coupled through a connector 152, which may be a standard nine pin connector, to the meter control unit 154, and receives messages from the meter unit 156. The schematic illustration of the meter unit 156 includes the accounting unit and the printing unit, as previously described. The control unit includes communication buffers 158 which will logically direct communication from the meter unit 156 to the external device 150 or locally to the control unit 154. The opposite effect is shown in FIG. 12, wherein external devices may communicate with the unit through the communications buffer. The effect is similar in that the buffer will receive messages from either the external device 150 or locally from the control unit 154.

Figure 13:
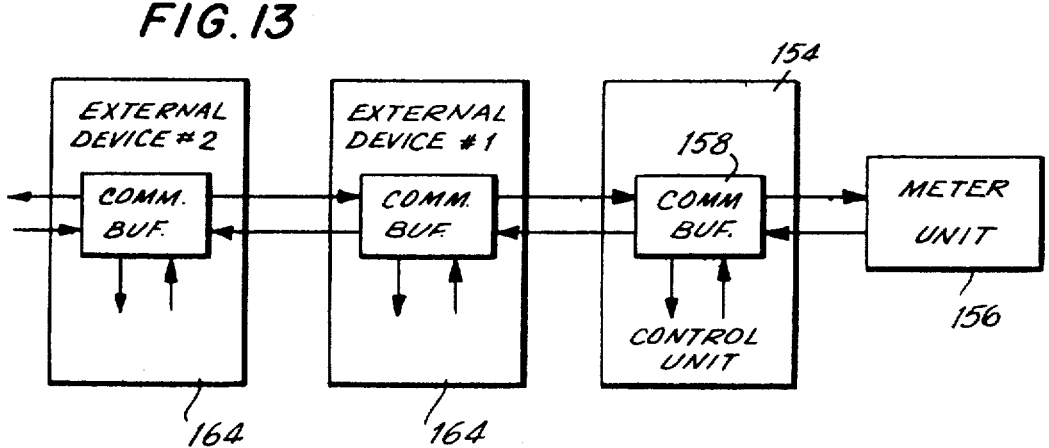
FIG. 13 is a diagram illustrating multiple external devices daisy chained to the meter.

In FIG. 13 a plurality of external devices 164 are shown, interfaced through the control unit 154 into the meter unit. Each external unit may be provided with its own control key for initiation of messages. Each external device could include a communication buffer as part of its software to permit operation of the external devices in a daisy chain manner. Appropriate messages can include complete subrogation of the control unit logic to the external device. The control unit programming is designed to permit such operation.

Regarding external device operation, information flows in two directions, either inbound towards the meter or outbound towards the external device. Control signals and requests, defined generally as controls, flow inbound towards the meter. Informational data flows outbound. Normally, on the inbound leg controls originate in the control unit. However, in accordance with this feature the invention will let an external device 150 issue commands right through the control unit to the meter unit. Conversely, informational data on the outbound leg, from the meter unit (accounting) comes to the control unit 154 and is repeated on the external device line 152 to the external device 150 if an external device is present. The presence of an external device 150 is determined by whether or not it responds with a clear to send signal. If not, the output on the line 152 goes off after a pre-set time period (times out) and the meter continues to function normally. This ability to pass information through the communication buffer in the control unit allows the advantage of placing external devices thereon. The external device may be constructed in the same manner, with a communication buffer, as shown in the control unit, such a device may, in turn, have an external device coupled thereto. Thus, a daisy chain of external devices 164, as shown in FIG. 13, can be provided. The only limitation on the number of external devices which may be daisy chained in this manner would be system tolerance and time out restrictions.

It is a further feature of the invention to provide external devices to give certain commands to the control unit itself, which commands do not necessarily need to go into the accounting module, such as the ability to write a message to the display of the control unit, or to read a message from the display of the control unit, or to command the control unit to disable its keyboard and the rotary three-position switch. In so doing, the communication buffer responds to a bit in the beginning of the digital transmission message sequence, or header, and directs whether the message is to go to the meter unit or the control unit. This bit, which has an assigned location in the header, as described above, is assigned a "1" in that position if it is a message to or from the control unit and a "0" if it is a message to or from the meter unit. In this manner, the control unit, when it receives a message from the external device, can examine the header and from this bit determine whether the message is for the control unit or for the accounting unit. If it is for the control unit, it stops the message and takes the appropriate action. If it is not for the control unit, the message is relayed to the meter unit. The control unit can provide a direct reply to the external device without involving the meter unit at all, for example, in response to receipt of a message to read the display. The control unit does not retain the last meter status message received. Thus, when a keyboard disable command is received, for example, the control unit will request a meter status message from the accounting unit. When the control unit gets the response, it will insert a bit into the meter status message to indicate whether the keyboard is enabled or disabled. Once disabled the control unit will continuously indicate a disabled state in the status message, until reset by receipt of a keyboard enable command, or until power is turned off and on. The keyboard will always be in the enabled state on a power up condition.

The meter is thus capable of interfacing directly with external devices, something that is difficult to impossible to accomplish with present meters.

Summarizing the above, the control unit is provided with a connector for bi-directional communication with a variety of external devices. This enables the external devices to access meter information, such as register readings, piece count, and current value selection. In addition, an external device can control the meter to the same extent that the operator could from the keyboard.

The meter can be equipped with an attachment to automatically record and charge-back postage to various departments based on identification information entered by the operator at the start of each mail run. The meter can be used with a display/receipt printer, providing the customer with a visual indication of the value on the meter and/or a receipt upon payment of postage. The meter can be used with customer-provided devices, such as a computer terminal or minicomputer system for real-time data capture, as in parcel operations for additions of postage to an addressee's bill.

The relative ease of interfacing to the meter of the present invention suggests further possibilities. Two examples are: (1) use on the end of a decision-making inserter to vary postage with varying number of inserts, (2) as a practical mailomat.

Flowcharts representing the sequence of operation of the various units are shown in FIGS. 14, 15, and 16. In each case, the unlettered figure shows the manner wherein the corresponding figure number and letter are assembled to represent a complete flowchart.

The flowchart representing the operation of the control unit is shown in the sequence of FIG. 14.

The flowchart representing the operation of the printing unit is shown in the sequence of FIG. 15.

The flowchart representing the operation of the accounting unit is shown in the sequence of FIG. 16.

The appendix of U.S. Pat. No. 4,301,507, of which this application is a division, is encorporated herein by reference, and is a detailed printout of each of the programs contained in the accounting unit, control unit and printing unit.

It is known and understood that the terms postage meter and postal meter, as used herein, refer to the general definition of a device for the imprinting of a defined unit value for governmental or private carrier parcel, envelope or package delivery, or other like application for unit value printing. Thus, although the term postal meter is utilized, it is both known and employed in the trade as a general term for devices utilized in conjunction with services other than those exclusively employed by governmental postal services. For example, private parcel or freight services purchase and employ postal meters as means to provide unit value pricing for individual parcels, including accounting and printing functions.

The present invention is particularly directed to use in a postal meter which will employ varying features and functions, described in differing aspects, in any one or more of the following groups of patents and copending patent applications, including this one, all filed concurrently on Oct. 30, 1979: U.S. Pat. No. 4,280,179 to Jones, et al., for "POSTAGE METER HAVING INTERACTIVE ARITHMETIC OPERATION CAPABILITY"; U.S. Pat. No. 4,280,180 to Eckert, et al, for "POSTAGE METER HAVING FIELD RESETTABLE CONTROL VALUES"; Ser. No. 89,426 to Eckert, et al, for "ELECTRONIC POSTAGE METER HAVING KEYBOARD ENTERED COMBINATION FOR RECHARGING"; U.S. Pat. No. 4,283,721 to Eckert, et al, for "ELECTRONIC POSTAGE METER HAVING CHECK DATE WARNING"; U.S. Pat. No. 4,266,222 to Eckert, et al, for "ELECTRONIC POSTAGE METER HAVING RESET BASE WARNING"; U.S. Pat. No. 4,285,050 to Muller for "ELECTRONIC POSTAGE METER OPERATING VOLTAGE VARIATION SENSING SYSTEM"; U.S. Pat. No. 4,287,507 to Eckert, et al, for "PRINT CONTROL SYSTEM"; U.S. Pat. No. 4,301,507 to Soderberg, et al, for "ELECTRONIC POSTAGE METER HAVING PLURAL COMPUTING SYSTEMS"; U.S. Pat. No. 4,302,821 to Eckert, et al, for "INTERPOSER CONTROL FOR ELECTRONIC POSTAGE METER".

While this invention has been disclosed and described with reference to a single embodiment thereof, it will be apparent that variations and modifications may be made therein, and it is intended in the following claims to cover each such variation and modification as falls within the true spirit and scope of the invention.

What is claimed is:

1. In a postal meter having a keyboard and display, central accounting and imprinting mechanism, and including accounting means, a control means, and a printer means, said accounting means controlling all of the accounting functions of the meter, said control means controlling all of the keyboard and display functions of the meter, and said printer means controlling the setting of the print mechanism and monitoring the mechanical functions thereof, the improvement wherein said postal meter comprises an interconnect means adapted to connect said control means to an external device, means for periodically scanning said interconnect means for signals, means responsive to a determined input on said interconnect means from an external device for transferring the function of said control means to signals at said interconnect means whereby said interconnect means represents said external device in communication with said accounting means and said printer means for providing data to said postal meter.

2. The meter of claim 1 wherein said display is interactive with said external device upon transfer of control thereto.

3. The meter of claim 1 wherein said control means, said accounting means and said printing means are serially interconnected with data and commands communicated from said control means to said accounting means and then to said printer means along a single pair of lines, and whereby status information is communicated along other lines in the reverse order.

4. A postal meter comprising an accounting means for controlling accounting functions of the meter, a control means and a printer for controlling the setting and activation of print mechanisms, interconnection means coupled to said control means and adapted to be connected to an external device, said control means further including a control logic portion and a communication buffer, said communications buffer including a first means for operating the communication buffer to convey messages from said accounting means to said control means and to said external device, and a second means for operating the communications buffer to convey messages from said external device to said accounting and control means.

5. The meter of claim 4, wherein said communications buffer includes a pair of communication channels in each of said first and second means for operating the communications buffer, said pair of channels coupling external device messages through said control means in each direction.

6. The meter of claim 5, wherein said control means responds to messages passed therethrough to perform specific requests, and provides updating to said passed messages to indicate a required control means response.

7. The meter of claim 5, further including a plurality of external devices adapted to be connected to said interconnection means in a serial daisy chain, each of said external devices including a bi-directional communications buffer acting to both receive and pass through messages received.

8. The meter of claim 4, wherein said control means message includes a header having a bit position identifying the source of destination of said message, and said control means logic includes means responding to said bit position information for appropriately routing said message.

9. The meter of claim 4, wherein said control means includes means responding to an external device message instructing the disabling of said keyboard.

10. In an electronic postage meter including an accounting circuit with electronic memory for storing postal data and postage meter routines, a printing system for printing postage under the control of the accounting circuit, and a control circuit having a keyboard and display, the control circuit being connected to apply data from inputs on said keyboard to the accounting circuits and to apply data stored in said accounting circuit to said display; the improvement further comprising a port on said control circuit enabling interconnection with an external device, said control circuit comprising means responsive to determined signals at said port for enabling the application to said accounting circuit of data input to said control circuit and the disabling of said keyboard, whereby said postage meter is controlled only by said external device.

11. The electronic postage meter of claim 10 wherein said means responsive to signals at said port further comprise means for applying accounting data from said accounting circuit to said port and disabling said display.

12. The electronic postage meter of claim 10, wherein said accounting circuit, printing system and control circuit form a unitary device.

13. The electronic postage meter of claim 10, wherein said port comprises a serial input and output port enabling communication on a serial bit by bit basis between said external device and said control circuit.

14. The electronic postage meter of claim 10, wherein said control circuit includes a communication buffer connected to direct communication with said control unit to enable communication with said accounting circuit either to said port or to internal portions of said control circuit.

15. In a postage meter having means within a secure housing for performing accounting and printing functions and including an electronic accounting circuit and control means coupled to apply data and control signals to the electronic accounting circuit for effecting the accounting and printing of postage, said control means including a first source of data and control signals; the improvement comprising port means for applying the signals to said control means from externally of said postage meter, said control means comprising means responsive to determine signals at said port means for enabling substantially direct communication between said electronic accounting circuit and a device connected to said port means, and means responsive to other determine signals at said port means enabling communication only between said control means in said device.

16. In a postage meter having means within a secure housing for performing accounting and printing functions including an electronic accounting circuit, and control means coupled to apply data and control signals to the accounting circuit for effecting the accounting and printing of postage, said control means including a first source of said data and control signals; the improvement comprising port means for applying further signals to said control means and means responsive to determine signals at said port means for enabling the application of data and control signals at said port means to said electronic accounting circuit to the exclusion of signals from said first source.

17. A device for controlling an electronic postage meter, comprising a port adapted to be interface with the postage meter, means providing postage meter command and data control instructions information, on a message basis, coupled to said port and means for receiving information signals from a postage meter interface with said port, said device being responsive to a clear-to-send signal at said port received from a postage meter connected thereto, for responding thereto.

18. The device of claim 17 further comprises communications buffer means enabling communication between a postage coupled to said port and further means coupled to said device.

19. The device of claim 18 wherein said device comprises a scale.

* * * * *

UNITED STATES PATENT AND TRADEMARK OFFICE
CERTIFICATE OF CORRECTION

PATENT NO. : 4,422,148
DATED : December 20, 1983
INVENTOR(S) : JOHN H. SODERBERG, et al.

It is certified that error appears in the above—identified patent and that said Letters Patent is hereby corrected as shown below:

Title page, references cited, add United Kingdom Patent No. 1100037 dated 1/1968.

Col. 9, line 4, delete "daigram" and insert -- diagram --.

Col. 17, Table I, third column, delete "412.00" and insert -- 412.500 --.

Col. 20, line 5, change "encorporated" to -- incorporated --.

Col. 22, line 55, after "means" insert -- , --.

Col. 23, line 19, change "determine" to -- determined --.

Col. 23, line 23, change "determine" to -- determined --.

Col. 23, line 24, delete "in" and insert -- and --.

Col. 24, line 3, delete "the" (first occurrence) and insert -- said electronic --.

Col. 24, line 13, change "interface" to -- interfaced --.

UNITED STATES PATENT AND TRADEMARK OFFICE
CERTIFICATE OF CORRECTION

PATENT NO. : 4,422,148

DATED : December 20, 1983

INVENTOR(S) : JOHN H. SODERBERG, et al.

It is certified that error appears in the above—identified patent and that said Letters Patent is hereby corrected as shown below:

Col. 24, line 14, delete "the" and insert -- a --.

Col. 24, line 15, change "instructions" to -- instruction --

Col. 24, line 18, change "with" to -- within --.

Signed and Sealed this

Ninth Day of October 1984

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO.   : 4,422,148
DATED        : December 20, 1983
INVENTOR(S)  : JOHN H. SODERBERG, et al.

It is certified that error appears in the above—identified patent and that said Letters Patent is hereby corrected as shown below:

Title page, references cited, add United Kingdom Patent No. 1100037 dated 1/1968.

Col. 9, line 4, delete "daigram" and insert -- diagram --.

Col. 17, Table I, third column, delete "412.00" and insert -- 412.500 --.

Col. 20, line 5, change "encorporated" to -- incorporated --.

Col. 22, line 55, after "means" insert -- , --.

Col. 23, line 19, change "determine" to -- determined --.

Col. 23, line 23, change "determine" to -- determined --.

Col. 23, line 24, delete "in" and insert -- and --.

Col. 24, line 3, delete "the" (first occurrence) and insert -- said electronic --.

Col. 24, line 13, change "interface" to -- interfaced --.

UNITED STATES PATENT AND TRADEMARK OFFICE
CERTIFICATE OF CORRECTION

PATENT NO. : 4,422,148

DATED : December 20, 1983

INVENTOR(S) : JOHN H. SODERBERG, et al.

It is certified that error appears in the above-identified patent and that said Letters Patent is hereby corrected as shown below:

Column 24, line 14, delete "the" and insert -- a --.

Column 24, line 15, change "instructions" to -- instruction --

Column 24, line 18, change "face" to -- faced --.

Column 24, line 18, change "within" to -- with --.

Column 24, line 23, insert -- meter -- after "postage".

This certificate supersedes certificate of correction issued on October 9, 1984.

Signed and Sealed this

Twenty-eighth Day of May 1985

[SEAL]

Attest:

DONALD J. QUIGG

Attesting Officer

Acting Commissioner of Patents and Trademarks